United States Patent
Shelton

(10) Patent No.: US 9,032,544 B2
(45) Date of Patent: May 12, 2015

(54) SYSTEM AND METHOD FOR CONTROLLING COMMUNICATION OF PRIVATE INFORMATION OVER A NETWORK

(75) Inventor: Robert Shelton, Irvine, CA (US)

(73) Assignee: Private Access, Inc., Irvine, CA (US)

( * ) Notice: Subject to any disclaimer, the term of this patent is extended or adjusted under 35 U.S.C. 154(b) by 237 days.

(21) Appl. No.: 13/334,982

(22) Filed: Dec. 22, 2011

(65) Prior Publication Data

US 2012/0331567 A1    Dec. 27, 2012

Related U.S. Application Data

(60) Provisional application No. 61/426,190, filed on Dec. 22, 2010.

(51) Int. Cl.
*G06F 21/00* (2013.01)
*G06F 21/62* (2013.01)

(52) U.S. Cl.
CPC .................................. *G06F 21/6245* (2013.01)

(58) Field of Classification Search
USPC .......................................................... 726/28
See application file for complete search history.

(56) References Cited

U.S. PATENT DOCUMENTS

| | | | |
|---|---|---|---|
| 7,526,475 B1 * | 4/2009 | Verstak et al. ......................... 1/1 |
| 7,599,950 B2 * | 10/2009 | Walther et al. ......................... 1/1 |
| 8,316,449 B2 * | 11/2012 | Ginter et al. ..................... 726/26 |
| 8,332,740 B2 * | 12/2012 | Graham ........................ 715/200 |
| 8,381,134 B2 * | 2/2013 | Weise et al. .................... 715/853 |
| 8,473,487 B1 * | 6/2013 | Verstak et al. ................. 707/723 |
| 8,777,102 B1 * | 7/2014 | Patterson ....................... 235/380 |
| 2002/0029201 A1 * | 3/2002 | Barzilai et al. .................... 705/80 |
| 2004/0193448 A1 * | 9/2004 | Woodbridge et al. ............. 705/2 |
| 2005/0027995 A1 * | 2/2005 | Menschik et al. ............ 713/193 |
| 2005/0076233 A1 * | 4/2005 | Aarts et al. ..................... 713/201 |
| 2008/0071577 A1 * | 3/2008 | Highley ............................ 705/3 |
| 2008/0127310 A1 * | 5/2008 | Robbins et al. ..................... 726/4 |
| 2009/0061884 A1 * | 3/2009 | Rajan et al. .................... 455/445 |
| 2009/0287837 A1 * | 11/2009 | Felsher ......................... 709/229 |
| 2009/0307755 A1 * | 12/2009 | Dvorak et al. .................... 726/4 |
| 2010/0131902 A1 * | 5/2010 | Teran et al. .................... 715/843 |
| 2010/0153416 A1 * | 6/2010 | Gur-esh et al. ............... 707/758 |
| 2010/0185871 A1 * | 7/2010 | Scherrer et al. ............... 713/186 |

(Continued)

OTHER PUBLICATIONS

Sharon F. Terry, "Openness as Process and Product", Apr. 24, 2010, pp. 1-21.*

(Continued)

*Primary Examiner* — Yonas Bayou
(74) *Attorney, Agent, or Firm* — Burns & Levinson LLP; John C. Serio

(57) ABSTRACT

A system and method for controlling access to private information over a network is provided including a privacy preference repository accessible by one or more subjects of the private information and by a private access bureau. The privacy preference repository stores privacy preferences configured by the subjects to indicate conditions for disclosure of said private information. A policy repository that stores legal criteria for accessing the private information is also accessible by the private access bureau. The private access bureau is configurable to receive requests from privacy-enabled systems for privacy directives that take into account the privacy preferences and legal criteria required to release particular documents on said privacy enabled system in response to the privacy-enabled systems.

14 Claims, 19 Drawing Sheets

(56) References Cited

U.S. PATENT DOCUMENTS

| | | | |
|---|---|---|---|
| 2011/0022414 A1* | 1/2011 | Ge et al. | 705/3 |
| 2011/0251937 A1* | 10/2011 | Falk et al. | 705/34 |
| 2011/0283335 A1* | 11/2011 | Bussard et al. | 726/1 |
| 2011/0307318 A1* | 12/2011 | LaPorte et al. | 705/14.33 |
| 2012/0124637 A1* | 5/2012 | Dunaway | 726/1 |
| 2012/0321271 A1* | 12/2012 | Baldwin et al. | 386/201 |
| 2013/0035946 A1* | 2/2013 | Ratan et al. | 705/2 |

OTHER PUBLICATIONS

104th Congress, "Health Insurance Portability and Accountability Act", 1996, pp. 1-18.*

Sheping et al., "Negotiation Between Requester and Provider Based on PragmaticsWeb Service", 2009.*

* cited by examiner

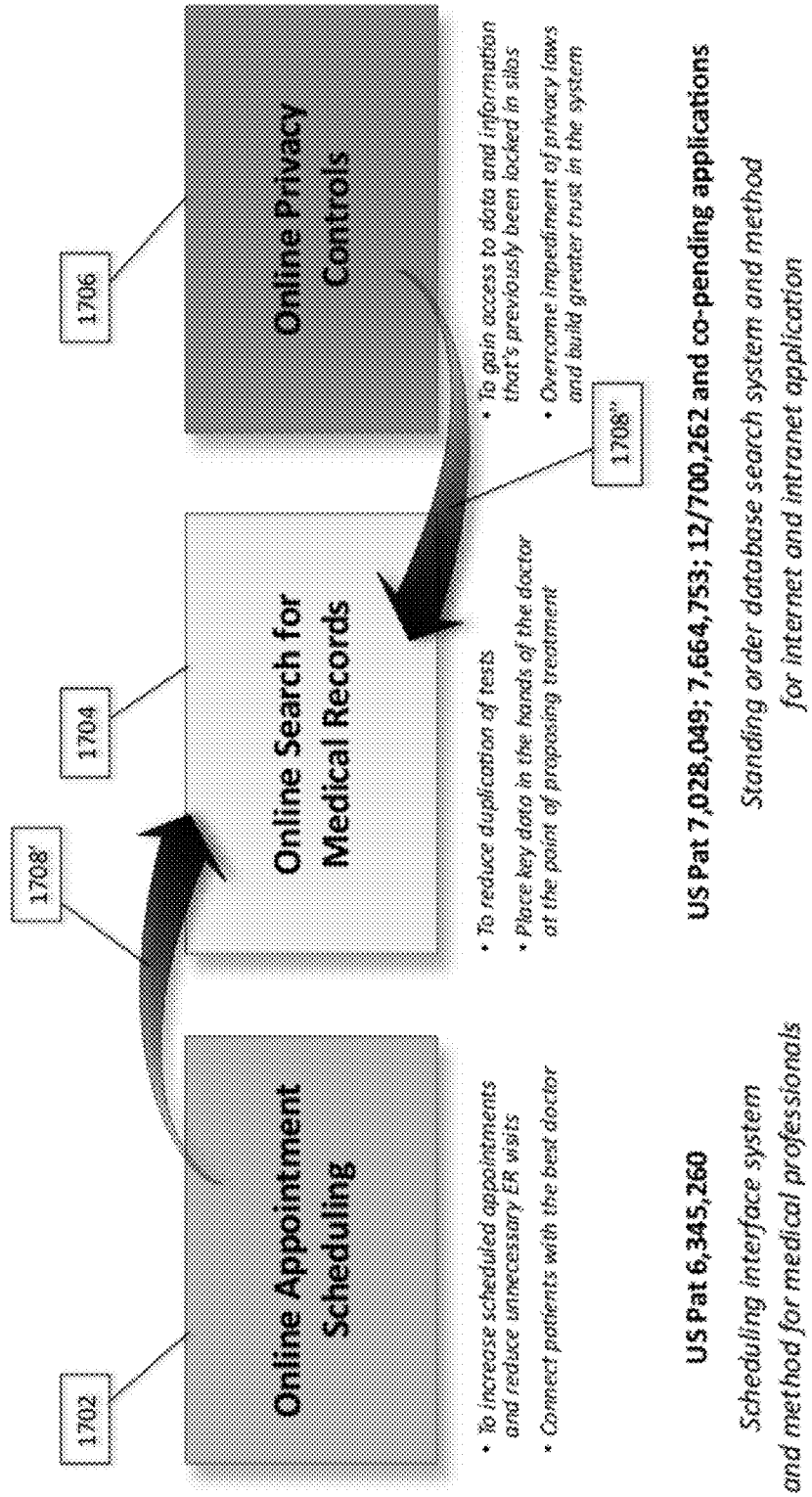

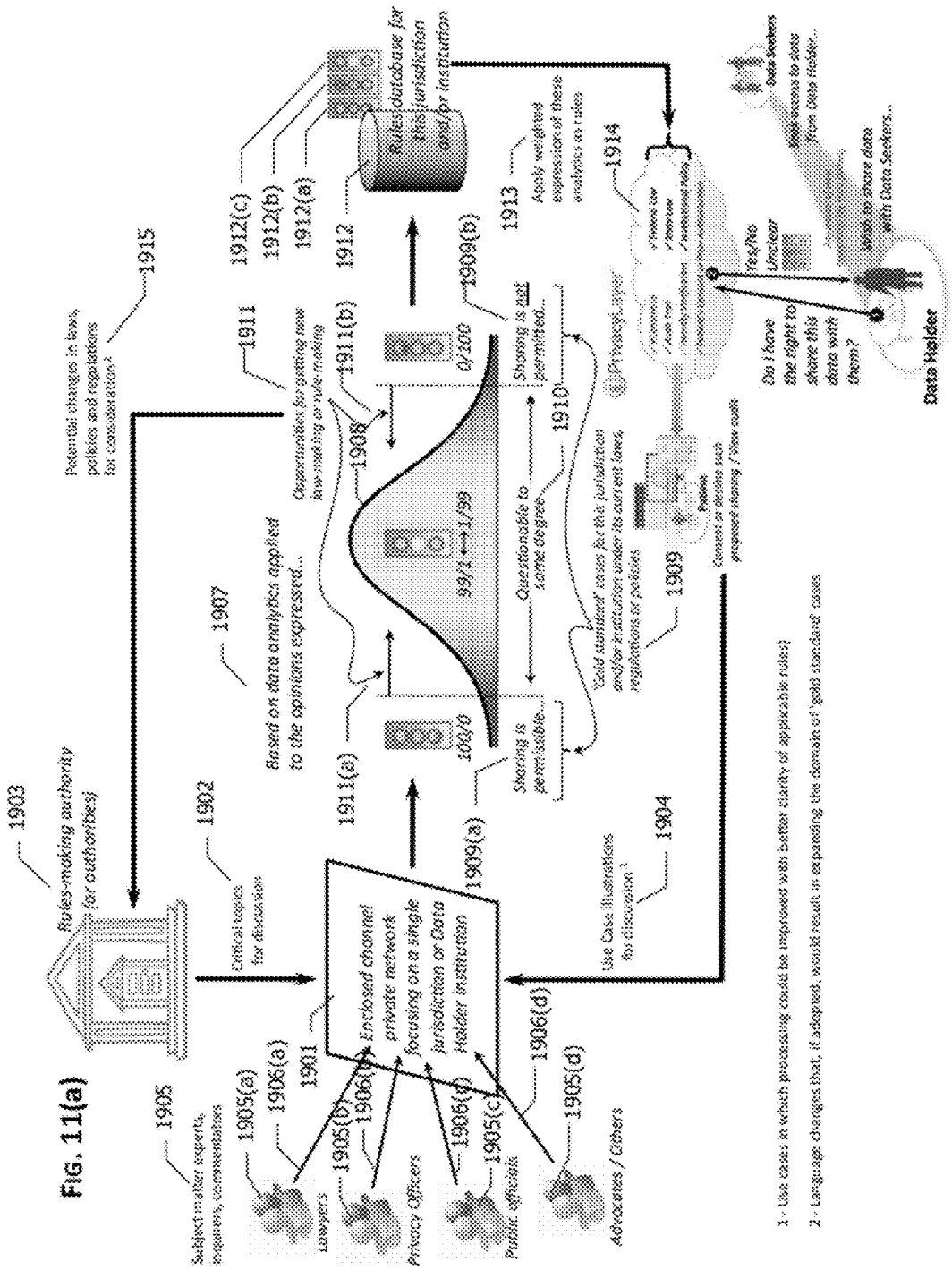

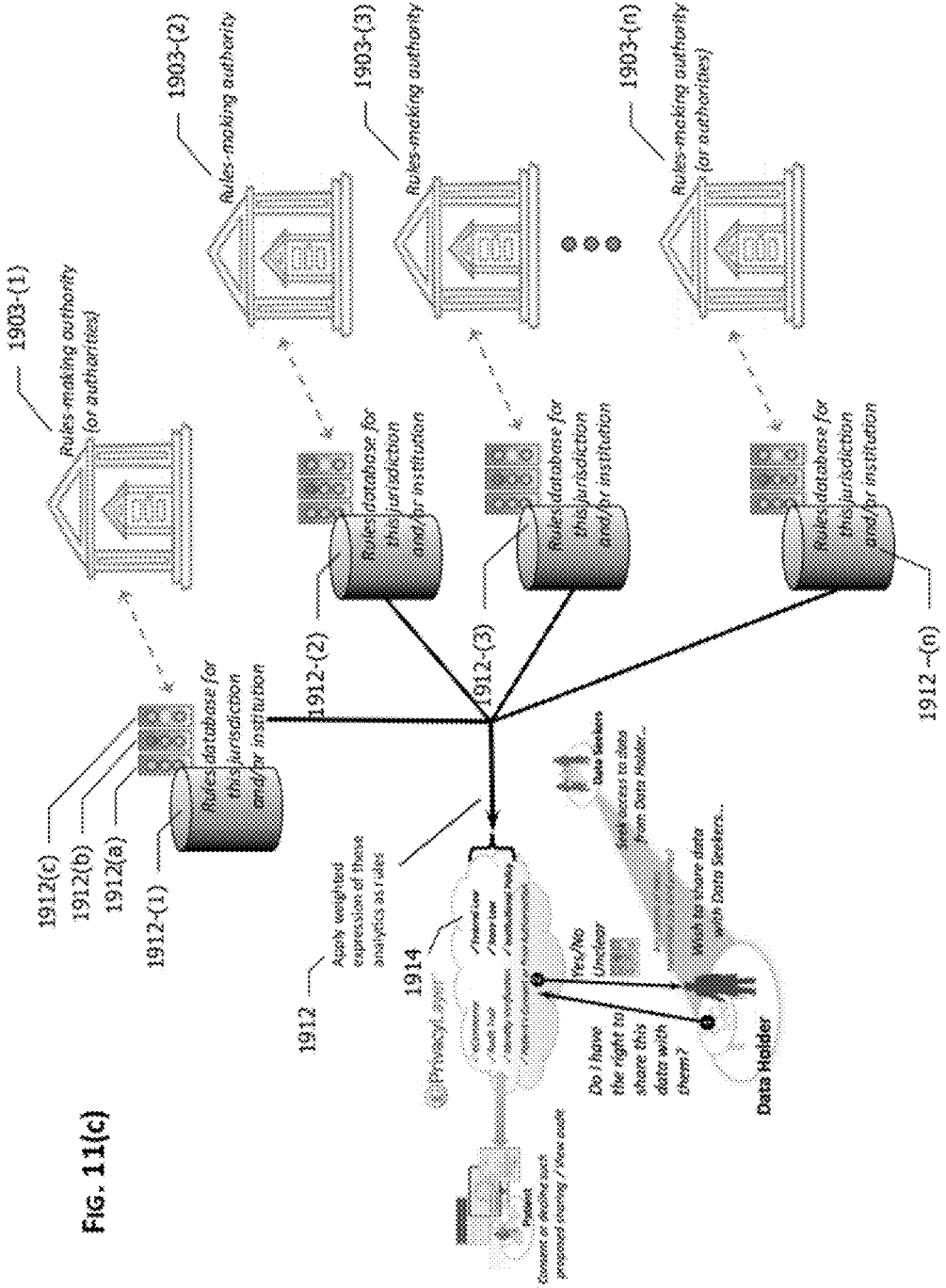

SYSTEM AND METHOD FOR CONTROLLING COMMUNICATION OF PRIVATE INFORMATION OVER A NETWORK

CROSS REFERENCE TO RELATED APPLICATIONS

This application claims the benefit of U.S. Provisional Application No. 61/426,190, filed on Dec. 22, 2010 the contents of which are incorporated in its entirety.

FIELD OF THE INVENTION

The present disclosure relates to systems and methods for controlling the regulation of data flow including private information over a network, and more particularly to a privacy decision point, authorizations manager, or bureau in communication with user privacy preference repositories and policy repositories for controlling access to private information over the Internet.

BACKGROUND

The development of automated systems and methods for exchanging private information such as medical records and data between various healthcare stakeholders has been attempted and found to be technically and logistically challenging, particularly at large scale. Such systems and methods involve challenges such as digitizing paper records, connecting disparate systems, securing electronic channels, authenticating identity, developing broadly-accepted semantic structures, and navigating legal/regulatory requirements. As an infrastructure for such systems and methods develops, improved methods for regulating the flow of private data are needed in order to fulfill a number of key operational functions attendant to satisfying legal and regulatory requirements and to engender trust in the system.

Such systems for regulating the flow of data must address potentially conflicting interests from various stakeholders. For example, in the case of healthcare information, the individual about whom such records pertain may prefer that no one see certain parts of their medical information under any circumstance, while a healthcare worker, researcher or public health official may wish to use that information for providing services and securing timely payment, conducting research, or verifying compliance, each with varying needs for data access and the right to share at least some portion of the data (or information derived from it) with others.

Similarly, a company selling health-related products or services may wish to utilize the information to target marketing messages to the data subject, with the hope of increasing sales. To the extent these goods and services are valued by them, this use of the consumer's private information may be highly useful and appreciated. However, the use of non-public information to generate this targeted marketing message—particularly if it is not viewed as being of benefit—could be considered by the data subject (and in some cases, by the law) as a violation of the individual's right to privacy, and the use or release (particularly if sold) of the information that gave rise to this offer as having been a breach of trust by the party to whom the person initially provided the data.

Different jurisdictions have addressed these sorts of conflicting interests with a set of heterogeneous laws such that the country has multiple (and at times contradictory) rules associated with data use and sharing, including (in some instances) the requirement for, and content of, notices of privacy practices and express authorization that may be required. Generally speaking, when such state laws are more stringent than the federal law regarding limitations imposed on the use and/or disclosure of this information, state laws are given precedence; and when the federal law is more restrictive than under the applicable state statute, the federal law takes precedence. Despite concerted efforts to "harmonize" these regulations in an effort to make implementing data exchanges across jurisdictional boundaries less challenging legally, the heterogeneity of jurisdictionally distinct laws and applicable regulations persists. Moreover, each institution or corporate entity that holds such information (individually referred to herein as a "data holder," or collectively as "data holders") may within the broad bounds of governing laws and/or guidelines develop its own policies and procedures for when data is released, or when (by way of non-limiting example) express consent by the individual to whom such records pertain, or their designated agent or representative, is required.

Such data holder privacy policies are commonly lengthy, exceedingly complex, and generally filled with legal terminology. Some groups criticize such policies for being excessively restrictive and representing an impediment to meaningful data exchange, and others criticize these policies for being overly permissive and deceptive by virtue of creating the appearance of protections that is far greater, they contend, than is actually the case. And nearly everyone criticizes the written policies for being incredibly difficult to understand, full of obfuscated language, and of extremely limited practical value. Accordingly, whether it pertains to signing the mandatory Acknowledgement of Privacy Policies notice required by HIPAA on a paper form in the presence of a witness, or clicking on the "agree" box in the case of online click-through policy disclosures, clearly a majority of consumers perceive that beyond wholesale opt-out, they have no other choice and thus consent so they can get on with their transactions. For these reasons, such blanket and arguably uninformed consent practices are also troubling to a number of advocacy groups, regulatory officials and lawmakers.

Complicating matters even further, applicable laws, regulatory policies, institutional rules, and consumer wishes respecting the right to access, employ and/or share private data are inherently subject to changes over time as political will or personal preferences shift, as concerns are exposed in the media or through investigative studies, or in response to changes in circumstance, knowledge, awareness or perspective. This is true not only in healthcare, but also across a large number of fields of use. A non-limiting list of fields presenting similar challenges and for which the instant invention is relevant includes financial and investment documents and services; official documents and e-government services; legal, employment and educational documents; online social networking, gaming and behavioral marketing; online lead generation; search engine usage; geo-location, cyber-security, law enforcement, and energy [smart grid].

The regulatory framework for privacy issues worldwide is currently in flux and is likely to remain so for the foreseeable future. Practices regarding the collection, use, storage, transmission and security of personal information by companies operating over the Internet, using mobile platforms and employing location-based technologies have increasingly come under public scrutiny, and civil claims alleging liability for the breach of data privacy have been asserted against numerous healthcare, social networking, online marketing and Internet search firms. The U.S. government, including the Federal Trade Commission (FTC) and the Department of Commerce, has announced that it is reviewing the need for greater regulation over the collection of information concerning consumer behavior on the Internet, potentially including regulations aimed at restricting certain targeted advertising practices. In addition, the European Union is in the process of proposing reforms to its existing data protection legal framework, which may result in a greater compliance burden for companies with users in Europe; and judicial decisions in several recent European court cases against Google and other large data holders have shown an increasing trend towards empowering consumers to control what data about themselves may be disclosed online when it is objectionable to them.

In 2009, in conjunction with adoption of the Health Information Technology for Economic and Clinical Health (or HITECH) Act, Congress adopted what some observers describe as being the most sweeping new privacy regulations focusing on healthcare data since 1996, when HIPAA was initially enacted. HITECH directs a federal investment of over $20 billion into health information technology (HIT) infrastructure and establishes strong incentives to encourage doctors and hospitals to use standards-based HIT systems to electronically exchange patients' health information. In conjunction with this bold stimulus effort to advance health data exchange (and to some degree borne out of associated concerns by consumer interest groups over attendant privacy risks and other implications), HITECH expressly mandates strengthening federal privacy and security laws to protect identifiable health information from misuse.

As the foregoing overview suggests, there presently exist significant challenges in seeking to apply to confidential information (as well as databases and/or documents containing at least some confidential information) otherwise highly effective, in many cases already widely employed, Internet-based technologies such as search engines, social networks, inference engines, location and behavioral tracking, and data mining. Difficulties arise from trying to apply these technologies that were designed for publicly accessible data to the rigors of simultaneously adhering to potentially highly restrictive, heterogeneous, and ever-changing data access and usage restrictions commonly associated with private data. And these challenges are multiplied by data replication, mirroring and packet transmission technologies that are used to minimize latency time, address load variations, and assure high reliability factors—all of which system users today take as givens for leading websites and web-based services. Accordingly, a number of observers have gone so far as to assert that it is impossible to reconcile traditional notions of privacy with these sorts of networked technologies and increasingly pervasive database integration tools and techniques; and thus in deference to the benefits these technologies can afford, privacy should no longer be anticipated.

To at least some degree, the challenge of designing sufficient tools for data regulation, distributed management, and accountability arises in part from the design of the Internet, and conscious tradeoffs that have been made in its fundamental architecture. As described in the 1988 review paper entitled "*Design Philosophy of the DARPA Internet Protocols*," this architecture intentionally does not presume the underlying networks themselves can support multiple types of services, in part because this would violate one of the fundamental goals, which was to support all existing networks as well as new innovations that extend beyond what can even be foreseen. Instead, the hope was that multiple types of services could be constructed out of the basic datagram building block using algorithms within the host and the gateway. And that on the other side of what is commonly referred to as the architecture's "narrow waist," a number of different transport protocols could be used to provide all sorts of services and incorporate different networks and network providers.

Thus, although the Internet makes it possible in principle for any sort of data to flow from any device to anyplace over virtually any means, it has historically done a poor job in respecting authority and governance issues and taking into account privacy issues because in a very real sense, its fundamental architecture simply wasn't designed with these needs in mind—or perhaps more forgivingly, the needs were recognized, but were not as high on the list of priorities at the time. Rather, the central philosophy of the architecture was (and to a large measure still is) to support as many networks as possible and to enable the universal interconnection of multiple networking technologies and heterogeneous links into a single interoperable network.

While this has worked extremely well in many respects, it can also be observed that some of the more significant anxieties regarding the Internet and the application of Internet-based systems and methods with respect to confidential information arise from the tradeoffs made in adopting such a ubiquitous philosophy. Thus, as entities increasingly seek to employ the Internet and Internet-based systems as a means for communicating confidential information such as medical records, financial information, and a wide array of sensitive and/or personally identifying characteristics that are highly desirable for some persons and systems to see and utilize, but potentially damaging or embarrassing if shared ubiquitously, this presents a unique challenge.

Without meaningfully addressing the issue of data flow regulation, already prevalent problems such as data misuses, privacy breaches, and legal violations are likely to become even more frequent as use of these technologies proliferates. It is widely known that today's Internet companies, are constantly being criticized for perceived privacy violations. Federal and state regulators, investors, and consumers all want to be assured that data holders are, on the one hand, adequately addressing consumers' reasonable concerns about minimizing related privacy risk (and from the data holders' perspective, associated concerns about reducing privacy violation risks), and at the same time to ensure that privacy protections do not foreclose the numerous benefits to be gained from greater data liquidity, including improved services, cost savings, increased revenue and profits.

SUMMARY

In general, in one aspect, the disclosure features a system and method for regulating the flow of data including private information over a network, and more particularly for establishing and operating a privacy decision point, authorization manager, bureau or the like (collectively referred to herein as a "private access bureau") in communication with user preference repositories and policy repositories for controlling access to private information over one or more networks, including the Internet.

While a private access bureau may be established for a single enterprise, geographic area, network, or market segment, in one illustrative embodiment, the private access bureau is established as a consumer-centric, cross-industry facility such that its user preference repositories and policy repositories are utilized by multiple entities, enterprises, websites, online services, networks, and other data holders, data seekers and data subjects. Also, in another illustrative embodiment, the private access bureau (or a few such competing bureaus as is the case for consumer credit ratings bureaus) is independent and privacy policy-agnostic (meaning that it takes no position on whether data that its systems and services help to regulate should be shared widely or maintained as being strictly confidential) so that consumers and data holders have less reason to doubt that the actions of the private access bureau is tainted by an agenda beyond fulfilling its intended purpose of regulating the flow of such data in accordance with then applicable policies and personal privacy preferences. Any systems that confer and to the extent applicable, base their actions to control access to or sharing of data they are holding based on privacy directives received from the private access bureau are collectively referred to herein as being "privacy-enabled," and the applications and services employed by them as being "privacy-assured".

In another general aspect of the disclosure, the private access bureau houses granular privacy preferences (to the extent any have been submitted) for each unique user, together with institutional rules and jurisdictional regulations; and in a preferred embodiment, these individual preferences and rules are collected for all websites, firms and other enterprises that utilize the bureau and/or store the consumers' personal information. Each data holder makes inquiries of the private access bureau to acquire proof of the original authorization to access, utilize or share personal data (or personal data elements), or alternatively to verify the right to do so (i.e., absent express consent) on the basis of then current, applicable policies. To the extent there is any question, in one illustrative embodiment of the disclosure, the private access bureau enables the consumer to dynamically update their privacy preference settings (including in response to inquiries initiated, when necessary or preferred, by the private access bureau), from any standards-based Web browser or Web-enabled mobile device.

An optional aspect of the disclosure relates to establishing and communicating to consumers a more understandable and enabling privacy policy for a company, institution, website, social network, or online service based on utilizing the private access bureau. Thus, for example, in one illustrative embodiment, the privacy policy disclosure for a large social networking service could reflect a baseline (institutional) policy concerning the extent to which that website or service may access, use and/or share data that it receives from consumers but acknowledge that some users may want more (or less) private treatment of their data or identity than the baseline policy stipulates and, to the fullest extent permitted under the then applicable law, the website or service will abide by each individual user's personal privacy preferences as reflected, from time to time, within the private access bureau. And in one illustrative embodiment, such a "concierge treatment" policy may be accompanied by a modest fee for the website or service agreeing to abide by more restrictive privacy obligations than its baseline policy dictates. This has the effect of making it possible for consumers who wish heightened privacy protections to pay for foreclosing certain otherwise lawfully permitted uses of their data, and at the same time to provide the service with a means by which to sustain its operations notwithstanding such curtailment in its baseline policy.

In a further illustrative embodiment, the consumer would be able to establish and monitor compliance with such privacy settings from a single source rather than one website or Internet-based service at a time. In another illustrative embodiment, if the data subject establishes less restrictive privacy preferences than the site's baseline policy and the law provides, this election might entitle the data subject to receive a share of the income derived by the site or service from such enhanced usage rights respecting that data.

In yet another general aspect, the invention adjudicates competing policies and personal privacy preferences to ascertain, to the extent possible, which policy or privacy preference dictates the privacy directive issued by the private access bureau. For example, if (1) the data of a consumer who is a resident of a state that has more highly restrictive regulations concerning data sharing than under federal law is (2) being held by a data holder located in a state with an applicable statute for this type of data and/or use that is less stringent than the federal law, and (3) the consumer has not expressed any privacy preference regarding how their data should be treated even though (4) in addition to stating a baseline institutional policy that is more restrictive than its state law but less restrictive than the state law of the state in which the consumer resides, the institutional policy of the data holder (5) states that it will abide by the consumer's wishes if requested, then the private access bureau would adjudicate these competing policies and user preferences (or absence of any) to specify, if possible, which applies to the data holder's proposed access, use or sharing of the data. Such decision concerning the net effect of all applicable policies and privacy preferences regarding the access, use or sharing of data is referred to herein as a "privacy directive"; and the process of determining among potentially competing policies and privacy preferences which has precedence over the other is referred to as "adjudication".

In yet another optional aspect of the disclosure, a system and method is provided to ascertain when inconsistencies, contradictions, ambiguities, and/or gaps in existing laws, regulations, rules, and policies render a privacy directive impossible to completely adjudicate. And in one illustrative embodiment, a system and method is also provided to recommend changes in applicable law, regulations or policies to resolve the observed challenges or gaps, and to communicate this to the appropriate legislative or administrative rule-making authority.

And in yet a further aspect of the disclosure, a system and method is provided for integrating the private access bureau with the system and method for recruiting subject for research studies and clinical trials, set forth in applicant's currently co-pending application Ser. No. 12/750,036, filed on Mar. 30, 2010, the contents of which are incorporated in their entirety by reference.

Illustrative embodiments of the present disclosure provide a system for controlling access to private healthcare information including a privacy preference repository accessible by one or more subjects of the private information and by the private access bureau. The privacy preference repository stores privacy preferences configured by the subjects of the data to indicate conditions for disclosure of said private information. A policy repository, which stores legal and regulatory criteria as well as institutional rules for accessing the private information, is accessible by the private access bureau. The private access bureau is configurable to receive requests from privacy-enabled systems for privacy directives taking into account, and where possible having the capacity to adjudicate, applicable privacy preferences and privacy policy criteria required to release particular documents on said privacy-enabled system in response to the privacy-enabled system having receiving a request for access to the private information by a system user or a third-party employing a privacy-assured application.

In several non-limiting examples, the systems and methods are described in connection with the private access bureau for implementing consumer control over the release of private data by a "Covered Entity" as defined in HIPAA, and for implementing regulatory requirements in a large-scale healthcare information exchange, such as a national or international healthcare information exchange. A centralized system including one or more private access bureaus acts as an automated advisor in regulating the flow of healthcare data with respect to a regulatory framework including numerous laws, preferences and policies relating to such healthcare documents and data. The private access bureau interacts at a system level to provide access decisions in response to receiving a request for data and processing rules over that data in accordance with the regulatory framework.

According to the disclosure, any kind of access and sharing policies can be reflected, and can be readily modified and reflected, at all privacy-enabled systems across the network. In addition to enabling dynamic consent by individual users, the invention will thereby lessen the risk that future changes in law or applicable regulations disrupt the core operating systems of a website or service that utilizes the private access bureau.

In a further aspect of the disclosure, assuming that an applicable law historically permitted an entity to use and disclose to third-parties a certain type of data such as an IP address, and that this law is changed by the lawmaking body, such that following an effective date, the disclosure of an IP address becomes prohibited without first receiving the express consent of the subject of the data. Even though what was previously permitted is now prohibited, no change would be required in the core operating system of any privacy-enabled service to implement the change according to one aspect of the disclosure. This is because each website or web-based service would merely continue to access or share the data it holds based on privacy directives issued by the private access bureau. And while privacy directives issued by the private access bureau would, in this illustrative example, change from "green" (permitted) to "red" (prohibited) or "yellow" (conditioned upon consent of the data subject) based on the applicable law change, everything else in the system would function technically in the same way as before the change in law took effect. Thus, from and after the new law's effective date, privacy directives for any data subject who does not have an express consent for sharing his or her IP address included in their privacy preferences profile would change from permissive to restrictive until the now requisite authorization is received and reflected in such privacy preferences data.

In another further illustrative embodiment of the disclosure assuming that the retention of a comprehensive audit trail of data disclosures that was previously not required becomes, on the basis of a newly-enacted state law, mandatory for any users who are residents of that state. Once again, in a preferred embodiment of the private access bureau, no changes are required in the core operating system of any privacy-enabled service, but rather the tracking of such disclosures for residents of the state must be added as a feature of the private access bureau.

As noted in the foregoing, it is widely known that today's Internet companies are constantly being criticized for perceived privacy violations, and one could argue that no matter what these companies do in terms of amending their privacy policy, some groups will continue to be dissatisfied. In one aspect of the disclosure, it is provided that the traditional privacy policy may be supplemented and/or replaced with a policy incorporating reference to each consumer's then current privacy preferences in the private access bureau that constrains or expands such rights in the baseline institutional policy from time to time, affords a number of advantages. Among these, it enables the site to respond that users who disagree with, are confused by, or otherwise don't wish to take the time to try and figure out the institution's baseline privacy policy should set their privacy preferences in the private access bureau. To the extent the latter change may require a nominal fee, a portion of such fee can be paid to the website or web-based service as a means of earning a return for its services and/or content without acting in a manner that is contrary to the data subject's wishes. At the same time, because other users may be less concerned about privacy, it will potentially afford the site more rights for those users who set privacy preferences expressly authorizing data access, usage rights, or sharing privileges that are greater than would otherwise be available merely on the basis of the entity's baseline policy or data derived by implication (rather than permission).

Similarly, it will be readily appreciated by those of ordinary skill in the art that it is advantageous to have a way, through the private access bureau, to address ambiguities or conflicts under existing law or institutional policies by permitting these to be explicitly addressed in the short term through the dynamic consent mechanism that is an integral part of the preferred system, as well in the long term—with the cooperation of the applicable lawmaking authorities—to be definitively resolved through application of the optional system and method for identification and resolution of ambiguities, contradictions and gaps in statutory language to be adjudicated computationally in the manner hereinafter described.

Those of ordinary skill in the art will additionally appreciate the advantage afforded by the disclosure having effectively provided an alternative to the traditional "proprietary siloed approach" in which privacy and data access policy are established and implemented for a single entity, enterprise, website, online service or network, by enabling the capital costs for establishing privacy controls to be shared across numerous users, and continued attention to be placed on system improvements and continuous innovation. Additionally, the fact that the private access bureau in an illustrative embodiment is both independent and privacy policy-agnostic provides the greatest basis for engendering trust since the private access bureau does not have an ulterior motive of gaining access to user data given that the private data itself remains in an illustrative embodiment at all times with the company, enterprise, website or service rather than the bureau.

At the same time, the system and method provide for greater reliability of user authentication, audit trails, and the opportunity for each user to effectively set up their preferences a single time, and then permit them to grow with visits to other privacy-enabled sites or services.

Other advantages and features of the present invention will be better understood from the following description, taken together with the following drawings, and from the claims.

DETAILED DESCRIPTION

Figure 1:
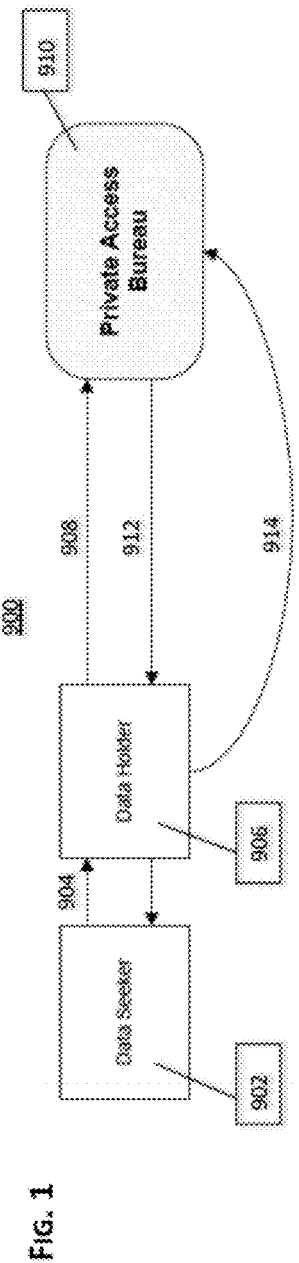
FIG. 1 is a system block diagram of a centralized advisory system according to an illustrative embodiment of the invention for determining the access rights each time private data is shared, or prospectively considered for being shared by a data holder.

In an illustrative embodiment of the invention that is described herein with reference to FIG. 1, a private access bureau provides a centralized advisory system 900 for determining the access rights each time confidential documents or private information such as personal healthcare data is shared. A data seeker 902 makes a request 904 of data holder 906 for a piece of healthcare data and/or data holder 906 seeks to share data with data seeker 902. Before deciding whether or not to do so and in order to help inform that decision, data holder 906 queries 908 the private access bureau 910 seeking guidance on the proposed data sharing. After analyzing access permission and rules governing the subject data, the private access bureau 910 sends a response 912 to data holder 906, such response taking into account in a preferred embodiment the then current status of available information concerning whether such proposed data sharing with data seeker 902 is permissible under international, national, state, institutional and personal privacy laws, regulations, policies and privacy preferences. Data holder 906 either shares or withholds the subject data in accordance with response 912 from the private access bureau 910.

Depending on the wishes of data holder 906 (and the permitted terms of use of the private access bureau), such privacy directives 912 may be treated as informative, binding, or a hybrid of the two. In the case of the former, the final decision respecting the proposed access, use and/or sharing of the record or data remains in the complete discretion of record holder 906 (whose actions eventually taken may or may not comport with the privacy directive). Alternatively, the data holder may elect to treat privacy directive 912 as binding, and integrate these directives with one or more aspects of data holder's security systems. In this optional embodiment, for example, transmitting or opening encrypted data packets may require that the applicable privacy directive permit such transmittal or access, respectively. While security and privacy are distinct functions, that are both technically and operationally unique, they are related architecturally and are coupled (conjoined) in a preferred embodiment. In this later case, and in systems that may be configured as hybrids of the two approaches, privacy directives 912 may be employed to afford an enhanced security mechanism by incorporating such directives as bounded architectural attributes that inform security of a privacy-enabled system and/or privacy-assured application both within procedural (e.g., user prompted) and systemic (e.g., automatic) functions.

In an illustrative embodiment, an indication 914 of the action taken by data holder 906 in respect to accessing or sharing the data is contemporaneously generated and sent back from the data holder 906 to the private access bureau 910, which in a preferred embodiment maintains an independent audit record of all data sharing between nodes and/or users of the network. Thus, in one preferred embodiment, the private access bureau may fulfill as an outsourced service the regulatory requirement under HITECH that data holders provide, if requested by data subjects, an "accounting of disclosures" concerning said data holder's sharing of the data subject's healthcare records and other information.

Figure 2:
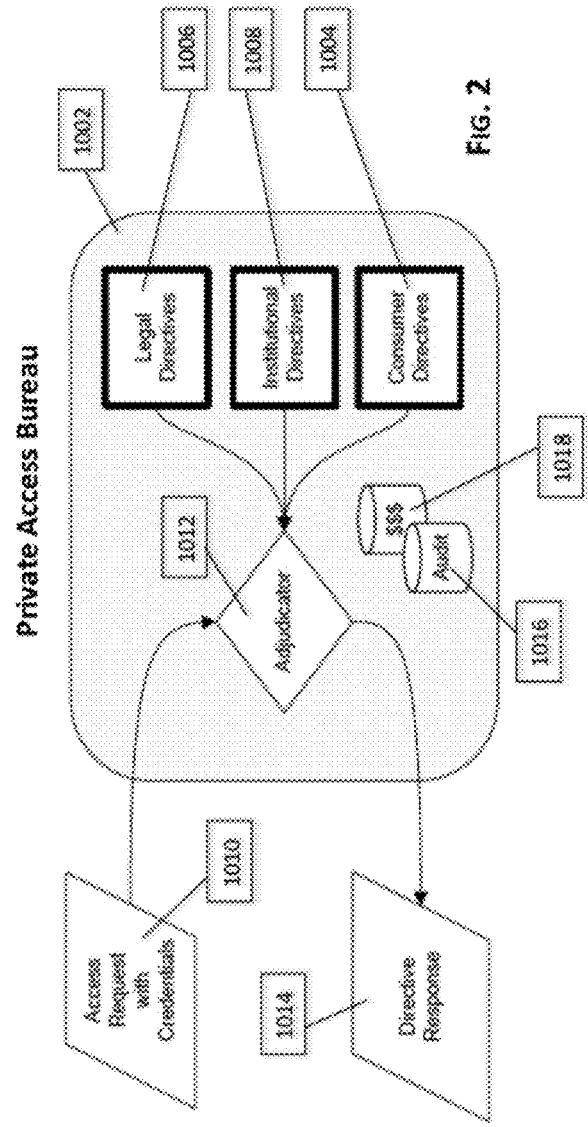
FIG. 2 is a system block diagram of a private access bureau according to an illustrative embodiment of the invention including a repository of privacy directives, that include the various rules governing access of each piece of private data.

Referring to FIG. 2, the private access bureau 1002 includes or has access to a repository of healthcare data directives, which include the various rules governing access of each piece of healthcare data. The directives can include consumer preferences 1004 (e.g., "I want to share my data only with my doctor"); legal and/or regulatory policies 1006 (e.g., "data for minors cannot be shared without parental consent"); and/or institutional policies 1008 (e.g., "no data is shared without payment of $X"), for example.

Illustratively, an access request 1010 including appropriate credentials is sent to the private access bureau as an electronic request. The private access bureau 1002 includes an adjudication engine 1012, which interprets the directives in response to the request and automatically generates a responsive recommendation indicating whether to allow access to the requested data. The private access bureau 1002 sends this recommendation in an electronic response 1014 to the requester. The private access bureau generates and maintains an optional audit record 1016 for each major step in the adjudication process. The private access bureau 1002 can also include in a preferred embodiment an optional transaction database 1018 in which a payment record for data access fees (if any) is maintained, for example.

Accordingly, to the extent that data holder 906 (or other party whose approval is needed before data is shared with data seeker 902) establishes a transaction fee for permitting access to such data or information, the private access bureau may assess such charge or charges in connection with adjudicating and providing the privacy directive response 1014. And in one preferred embodiment, the private access bureau may sustain the cost of its own operations by taking a portion of such transaction fee or fees, if any, before in turn disbursing them to the appropriate parties to whom related fees are obligated (i.e., the data holder 906, any parties—including the data subject 1102—and any other parties or service providers that data holder 906 specifies). One of the challenges with health information exchange has been developing a sustainability plan for entities involved in data exchange once government subsidies expire. The herein described transaction database 1018 may be used as the mechanism by which HIEs (Health Information Exchanges) earn income and are able to defray their own operating costs.

The illustrative recommendation process using the private access bureau executes very quickly, in the order of a few seconds or less, from the time a request is sent to the time that a response is delivered to the data holder 906, privacy-enabled systems and/or privacy-assured applications. Within the response a data holder 906 receives actionable advice regarding the proposed sharing of data with data seeker 902. The advice can be used by a data holder to decide upon an appropriate data sharing mechanism, such as electronic transmission or hand delivery, for example. Actual healthcare data need never reside with the private access bureau, which is responsible for maintaining the directives metadata and transaction history but not the documents and/or data to which these pertain. Persons of ordinary skill in the art will recognize the benefit of employing unique identifiers such as GUIDs (globally unique identifiers), DOIs (digital object identifiers), "Handles" and the like to represent this data—whether it be a single pixel, a word, phrase, document or entire library—to which these privacy directives pertain.

In the illustrative embodiment, a delivery mechanism for the private access bureau is similar to the well-known Domain Name Server (DNS) model for propagating IP addresses tied to Internet addresses in which the DNS server merely acts as a switch for directing Internet data. Like the DNS server, in a preferred embodiment, the private access bureau acts as a switch in directing the flow of healthcare data.

In addition to the system interaction mechanism described above, embodiments of the private access bureau can also provide one or more interfaces to allow interaction between various healthcare stakeholders. For example, such interfaces can include a portal for consumers to create new directives for their healthcare data, such as explicitly allowing certain researchers to view their non-personal healthcare data or allowing the researches to view the data only with the consumer's explicit permission.

A benefit of the private access bureau is that it provides a centralized decision making capability. A multitude of various directives are stored in a single location. Logical decisions can be made based on the directives and requests received at the central location. The private access bureau acts as adjudicator of the known laws and information. Even when the laws change, the bureau architecture persists and is capable of instantaneously reflecting those changes.

Another benefit is that the private access bureau is completely automated in the way it receives requests, makes decisions, and returns responses. Other systems interact with it behind the scenes as part of their process when exchanging data. The private access bureau only stores the directives that cover the data and not the data itself. Data holders remain the steward of the data and remain responsible for the appropriate use of that data (which they can determine, or be assisted in determining, through privacy directives generated by the private access bureau.) In addition, the private access bureau acts as the independent steward for the audit information.

In an illustrative embodiment, the private access bureau provides facilities for record holders to establish and bill for charges applicable to data sharing. This allows for a system in which data would not be shared until payment for data sharing is collected, for example.

To the extent that privacy can be protected, an electronic health data interchange improves data liquidity to benefit all of the medical stakeholders. The private access bureau model improves data liquidity for consumers by allowing them to open new channels of access for their healthcare data. It allows them to explicitly allow specific data seekers to see their data, overriding legal and institutional policies protecting that data. For example, they could allow their medical information to be shared (or not shared) with researchers. Consumers set their privacy preferences once and this applies to all data holders of their information.

Various institutions, both data holders and data seekers, have improved healthcare data liquidity with the private access bureau model. Data holders benefit by having explicit clarity on when they can share their data (including knowing definitively that the applicable rules by which they are asked to abide are contradictory or ambiguous), allowing them to interact with data seekers freely without having to determine the appropriate access themselves, or to turn to the data subject when appropriate or as an ultimate authority in the event the law and regulations do not provide them requisite clarity for data exchange. Data seekers benefit by having access to more explicitly shared data.

Medical research benefits from the data liquidity brought by the private access bureau. Researchers are able to tap into the vast amount of personally-identified medical data held by data holders based on explicit permissions (whereas current law precludes them from such access except, in certain instances, based on costly and time-consuming institutional practices, and in other cases based on employing much more limited data sets than would otherwise be preferred.)

The private access bureau also benefits commercial enterprises. For example, drug companies can focus their marketing efforts to specific individuals who have allowed portions of their medical data to be shared, perhaps initially in a de-identified form, based on their conditions or symptoms. Identity and other contact details can be added through the dynamic controls of the private access bureau as the consumer becomes convinced that there is sufficient value to them in revealing these details or permitting these enhance private access rights. Using such techniques, new markets can be created based on much more highly targeted marketing.

Consumers have more control and visibility over their healthcare data in the private access bureau model. Consumers, by interfacing with the private access bureau, can provide explicit instructions on when/how their healthcare data is to be exchanged. Based on the adjudication engine, the consumer's privacy preferences can be reflected in privacy directives issued by the private access bureau, which effectively override more restrictive legal and/or institutional policies, thereby empowering the consumer to do more with their data. For example, the consumer may decide to explicitly allow their information to be shared with medical researchers for recruitment purposes, personalized medicine, and other secondary uses, where before their data would be "locked up" by privacy restrictions in data silos.

The private access bureau interfaces with other healthcare stakeholders on behalf of the consumer. The consumer does not have to directly interface with these other stakeholders when it comes to the exchange of their healthcare data. For example, the consumer may decide to deny all access to their healthcare data, which would be enforced by the private access bureau. The consumer does not have to interact with the data seekers in this case since the bureau would deny access (unless a greater directive, such as the right to "break the glass" for access in the case of a medical emergency when the individual's data is deemed relevant to timely providing them care, took precedence on the basis of applicable law.)

By interfacing with the private access bureau, the consumer can get a consolidated "credit report" of their healthcare data transactions—who has sought to access it, where it has been shared, and on the basis of what declarations and authority. They can use this information in numerous ways, including auditing the exchange and sharing of their data, tracing the spread of the data, and reporting documented misuse to the appropriate authorities—in one preferred embodiment, all from a single interface or portal.

Besides the consumer, other healthcare stakeholders establish certain preferences, rights, laws, and policies that are accounted for in the private access bureau model. The private access bureau makes its decisions by factoring all directives and accounting for the known policy requirements for each stakeholder. The private access bureau preferably takes into account both consumer rights laws (i.e., the Health Insurance Portability and Accountability Act, "HIPPA") as well as individual consumer preferences. Data holders benefit from simplified ways to handle data privacy since the private access bureau model, once populated with relevant data, accounts for applicable laws, policies and personal preferences.

The private access bureau accounts for and prioritizes legal obligations at both the State and federal level. Healthcare data is shared appropriately with confidence. Since the private access bureau tracks all access and sharing, auditing data exchanges is simplified.

Various institutions have their own policies for the exchange of data outside their legal requirements. For example, an institution may not allow any of their medical data to be shared to marketing groups even if they are legally allowed to do so. These policies could also address the access of medical data internally to enforce policies such as "minimum necessary" rules under HIPAA. The private access bureau is able to navigate these policies by intelligently processing them, along with other directives, whenever there is a healthcare data request.

In addition to all its other services, the private access bureau logs its activities for history, tracking, and accountability. The private access bureau provides an interface for the consumer to centrally view all the access requests and decisions of their healthcare data. Other stakeholders, presuming the appropriate authority or authorization, may utilize audit logs generated by the private access bureau for a number of beneficial reasons. For example, a government agency may use the logs to investigate the misuse of data. Lawmakers may use the audit logs to track the effectiveness of certain laws. By analyzing the log, consistent undesired outcomes could result in creating new laws, or clarifications to existing laws, to correct them. New laws may be written by analyzing the log to implement corrective actions when consistent undesired outcomes are noted. Tracking data exchanges could also lead to alerting-type services similar to those provided by credit bureaus or online search services. Whenever there is a data exchange of a certain criteria, for example, the consumer could be notified.

Figure 3:
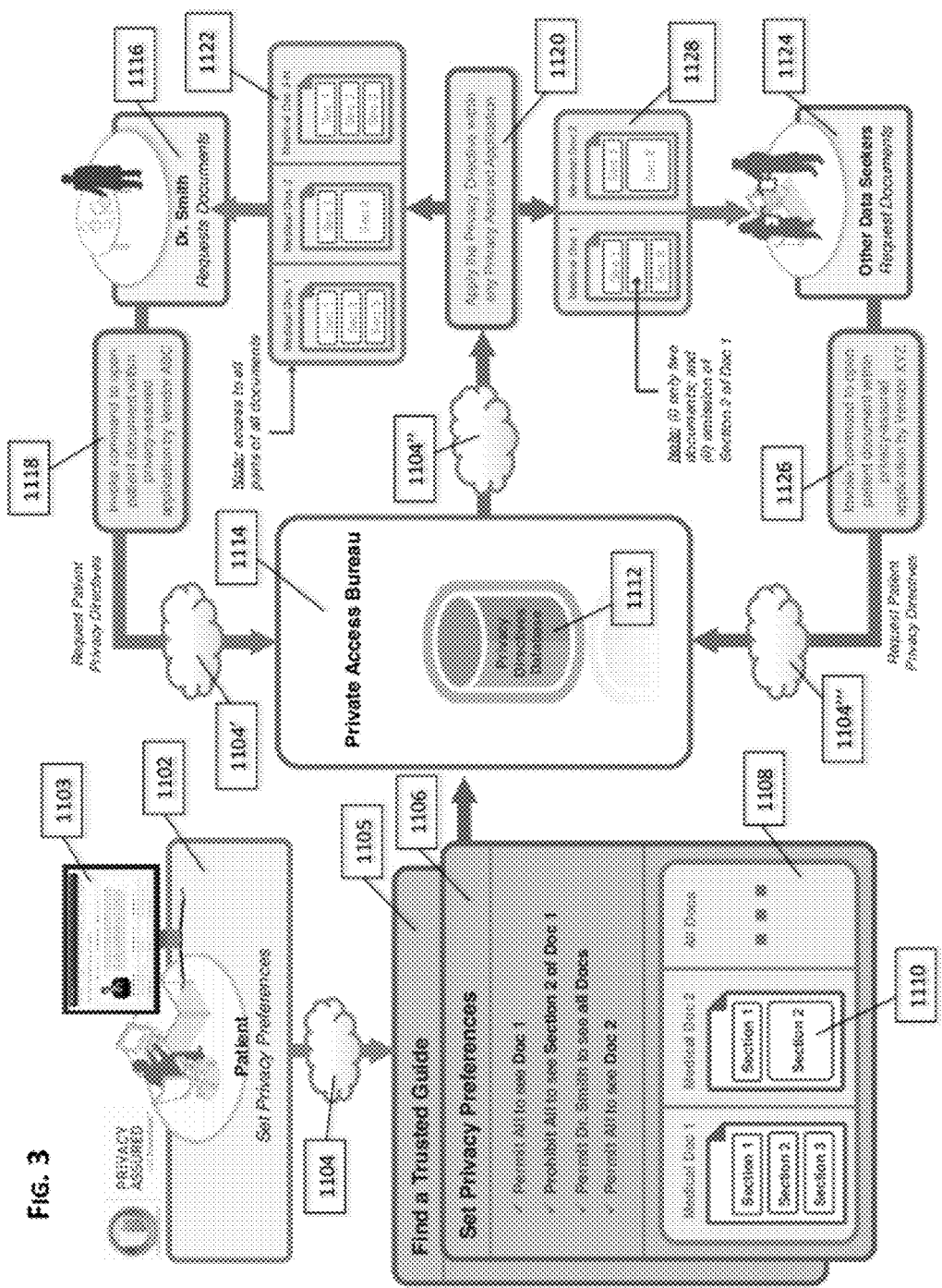
FIG. 3 is a process flow diagram for configuring privacy information and controlling access to private information in accordance with an illustrative embodiment of the invention.
Figure 7A:
FIG. 7, consisting of subparts 7a, 7b and 7c, is a mobile user interface for use in conjunction with the foregoing.
Figure 7B:
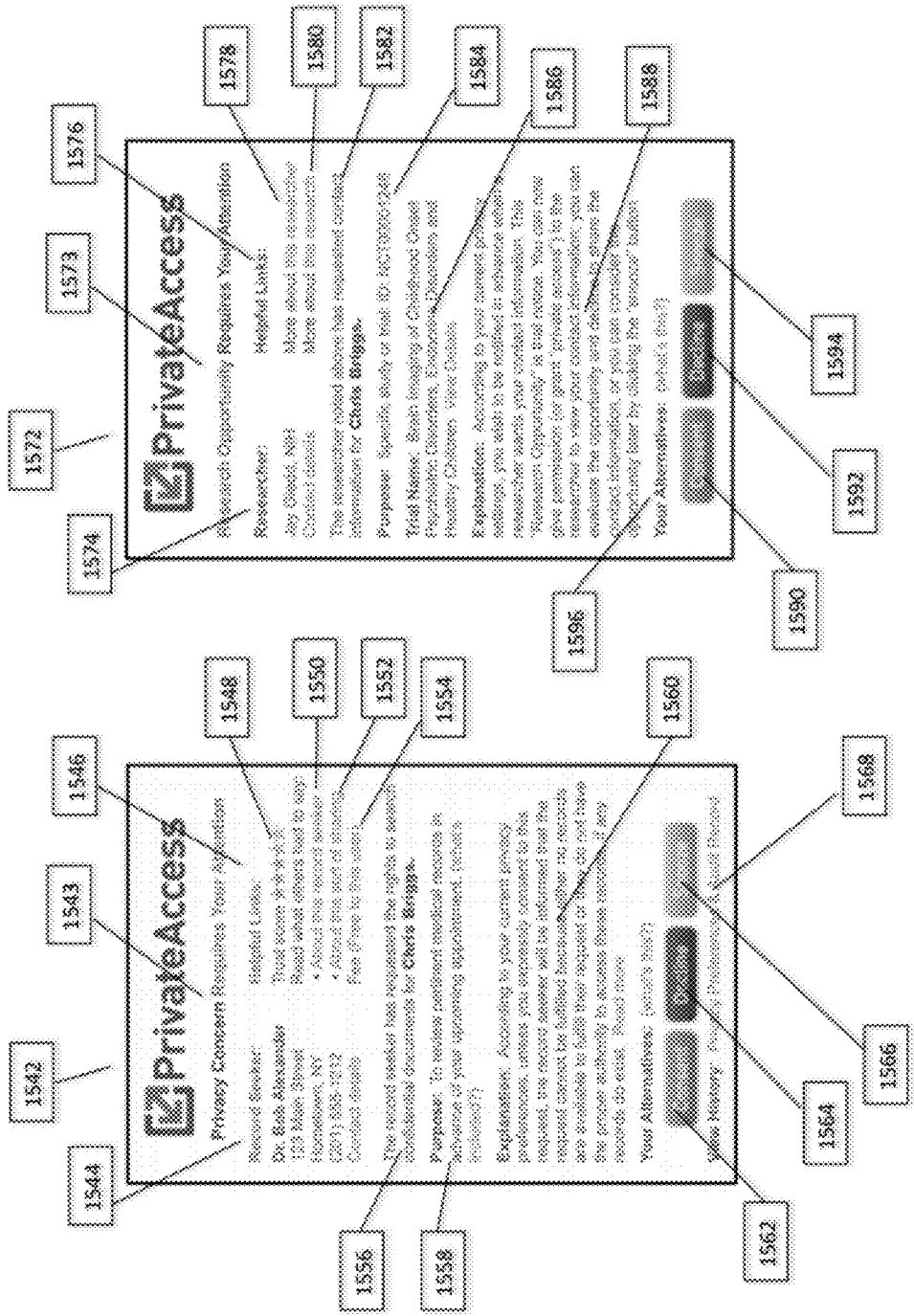
Figure 7C:
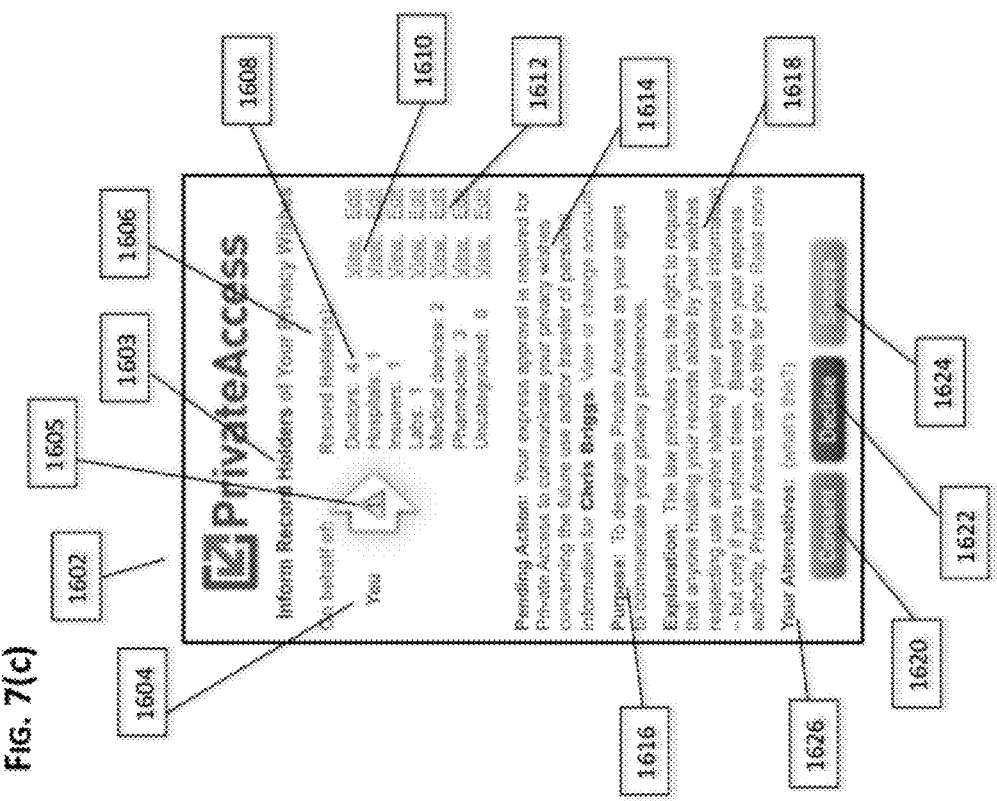

FIG. 3 provides a descriptive process flow diagram in which a patient 1102 from a standards-compliant web browser 1103 (or Web-enabled mobile device such as shown in FIG. 7) in communication with a network 1104, such as the Internet, may use an embodiment of the invention to configure privacy preferences 1106 for one or more particular documents 1108 or sections of documents 1110. In a preferred embodiment, such selection of privacy preferences for these documents and data elements may be assisted through the use of trusted guides 1105, whose input can assist the user in making the best suited privacy preferences. For example, if the patient is addressing a chronic disease or is diagnosed with a particular genetic variation, she should be able in one preferred embodiment to locate persons who have that same condition or variation who can assist her in setting privacy and access preferences in a manner best suited to achieving her objectives and respecting her concerns, if any, about privacy.

In yet another one optional preferred embodiment, multiple members of the community are invited to vote on the best possible settings taking into account various considerations. Such crowd-sourcing techniques are thus used to communicate for a user what privacy preference settings may be best suited for them, and effectively function as guides 1105. Social networking may also be used to refer ones privacy settings to close friends or family members (or to solicit their assistance and advice in setting ones own), which has the dual benefit of saving consumers time in figuring out the way they wish to proceed, communicating meaningful advice, and initiating viral marketing growth through word of mouth referrals. Additionally, it provides an opportunity for a new user to read about the high-level selections that these guides made in setting their privacy preferences, and to be assisted in a manner that does not feel coercive since the recommendations made by guides possessing different perspectives might lead to diametric-ally opposing privacy preference settings.

Once selected, the privacy preferences are stored in a privacy directives database 1112 within the private access bureau 1114. A healthcare provider 1116 may request patient documents by invoking a command 1118 to open patient documents within a privacy-enabled system or privacy-assured application running on a vendor's proprietary or open source system.

The privacy-enabled application 1118 communicates with the private access bureau 1114 via a network 1104' such as the Internet. The private access bureau communicates privacy preferences 1120 for the requested documents via a network 1104" such as the Internet to the privacy-assured application 1118. The privacy-assured application 1118 applies privacy directives 1120 to provide access to the requested documents 1122 within the application in accordance with the patient's privacy preferences 1110 or greater authority in accordance with adjudication 1012 of FIG. 2. The privacy-assured application then only delivers, displays or provides the permitted portions of these documents and information to the healthcare provider 1116 in accordance with these privacy directives.

Similarly, researchers 1124 may seek access to patient documents by invoking a command 1126 within a different vendor's privacy-assured application. The privacy-assured application communicates with the private access bureau 1114 via a network 1104''' such as the Internet. In response, the private access bureau communicates via a network 1104" privacy directives 1120, including (where applicable) the privacy preferences for patient 1102 that apply to the requested documents. The privacy-assured application 1126 applies these privacy directives 1120 to the provide access to requested documents 1128 to record seeker 1116 within the application 1126 in accordance with the patient's privacy preferences 1110 or greater authority in accordance with adjudication 1012 of FIG. 2. The privacy-assured application 1126 then only delivers, displays or provides the permitted portions of documents and information 1108 to the researcher 1124 in accordance with the privacy directives 1120 for record seeker 1124. It should be noted that communication networks 1104, 1104', 1104" and 1104' may be the same or separate networks.

Figure 4:
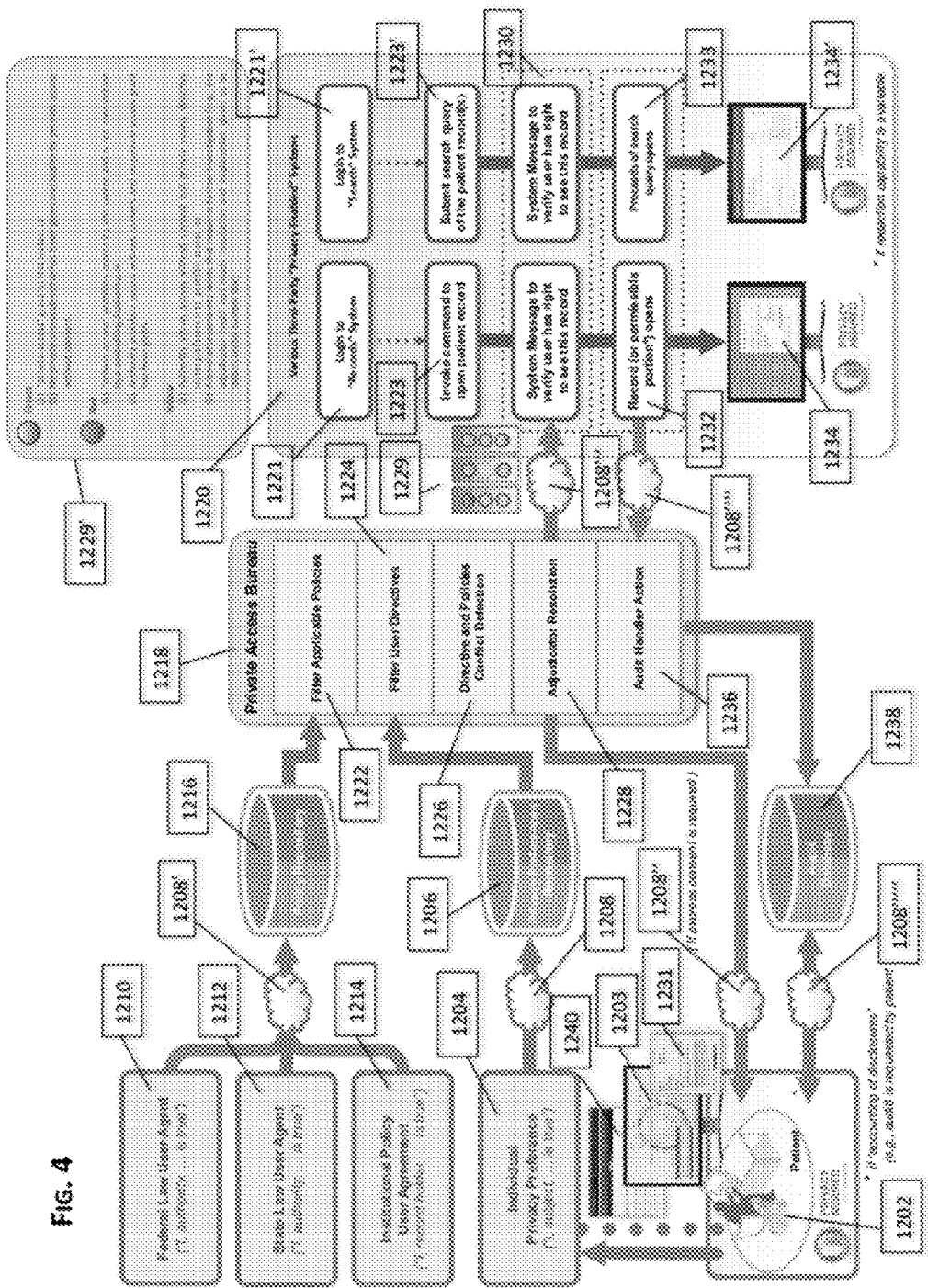
FIG. 4 is process flow diagram illustrating how a third party privacy-enabled system and privacy-assured applications interact with the private access bureau according to illustrative embodiments of the invention.

FIG. 4 provides a descriptive process flow diagram illustrating how third party "privacy enabled" systems and privacy-assured applications interact with a private access bureau according to illustrative embodiments of the invention. A patient 1202 from a standards-compliant web browser 1203 (or Web-enabled mobile device such as shown in FIG. 7) may configure individual privacy preferences 1204 for particular documents. Privacy preferences 1204 are communicated via a network 1208, such as the Internet, to a privacy preferences repository 1206. In a preferred embodiment, privacy preferences 1204 should be communicated as an ontological statement communicating all of the relevant metadata for establishing the privacy directives that will eventually dictate access, use and sharing of the documents and/or data to which such privacy preferences 1204 pertain.

As used herein, "privacy preferences" refer to a data element that for each individual contributor governs—preferably with highly granular specificity and in a dynamic manner if so desired by the user—who can or cannot access such information whether on an identified or de-identified basis, and/or for whatever express purposes or conditions such access rights are authorized. This would also include an indication of the legal authority for gaining access under federal and applicable State law absent such express authority from the individual data subject. An illustrative ontological statement for communicating such privacy preferences may, for example, recite:

<Grantor> by <Authority> sets <Designated Action> affecting <Record Holder> holding <Protected Data> for <Record Seeker> when <Pre-Condition> is met.

Where:
<Grantor> is the source or author of the directive. In the case of a personal directive, the Grantor is also the subject of the directive (or the person authorized to act on his or her behalf) and is able to edit/modify the directive. For an organization or jurisdiction, the Grantor may be an individual authorized to act on behalf of such organization or jurisdiction, or a system administrator entering directives to reflect that organization's or jurisdiction's directives;
<Authority> is the legal right or power invoked by the Grantor in asserting the directive, and helps to determine the priority of the directive when there are multiple, at times conflicting, directives to consider. Generally, when it pertains to an individual, the Authority is a personal preference based on the individual either being the subject of the data or legally authorized to speak on behalf of the data subject; and when it pertains to an organization or jurisdiction, the Authority is a policy or rule, and/or a law, statute or regulation, respectively. However, persons of ordinary skill in the art will recognize that in certain instances (i.e., for data pertaining to AIDS, mental health and substance abuse) the law may grant to the data subject greater Authority than in the case of other types of records or data;
<Designated Action> is the action the directive is applying to the Protected Data. It is limited in a preferred embodiment to "Allow" Protected Data to be shared, "Prohibit" it from being shared, and an instruction to "Ask Grantor" in the event it is requested by a Record Seeker, or that a Record Holder otherwise seeks to share it with another party (e.g., who for the purposes of the ontology, is also referred to as a Record Seeker). In the case of Ask Grantor, it means the Grantor is requesting to be notified and permitted to "allow" or "deny" such proposed access or sharing on a case-by-case basis;
<Record Holder> is the holder of the Protected Data to which the directive applies. This can help identify applicable institutional directives and legal directives (based on the location of the data) as well as help to identify the data by location. Generally, the Record Holder consists of a specific record holder, record holder group, record holder role, and/or composite role. Persons of ordinary skill will appreciate the benefits derived by utilizing, to the extent possible, a constrained list of Record Holders so as to most effectively enumerate in a non-ambiguous manner, individuals, organizations, groups, affiliations, roles and/or any combinations of these. In this regard, in a preferred embodiment, use of lists from various professional organizations may be useful, in addition to widely used standards and classification systems such as SNOMED CT codes for designating individual roles and SIC Codes for indicating types of organizations;
<Protected Data> is what the directive is protecting. In a preferred embodiment, the Protected Data section is broken into two sub-sections, one for "meta fields" and the second for content. Meta fields describe the data from a label-like approach, e.g. the labels of an envelope; and the contents describe the data contents that are protected. As noted above, in a preferred embodiment, in order to assure that the metadata tag does not inadvertently reveal information that is protected, the system utilizes a GUID or DOI to identify these subsections. Assuming a right to know the tag information, the contents section is used mainly for redaction and can be used by the enforcement point to redact data contents. Generally, the Protected Data consists of any structured or unstructured data, data elements, data aggregation, or data classification; and in a preferred embodiment may unambiguously identify the Protected Data by any number of industry standards based on subject identifiers, data identifiers, data classifications, data types, data dates, or data super types. Additionally, the Protected Data may be literal or as queried, be based on text location, defined by x-paths, or simply reference a GUID, DOI or the like. In a preferred embodiment, the meta field and corresponding content for Protected Data may itself be treated in whole or in part as Protected Data, and thereby protected from disclosure except to authorized Record Seekers based on a first-order application of the ontological statement such that non-authorized Record Seekers are unable to access even the meta data regarding the Protected Data. By way of non-limiting example, several widely employed standards that may be used in providing a constrained list, which is preferred, for use in conjunction with the ontology include ASTM E1986 (for element type), HL7 Confidentiality (for data classification), and HITSP CDA Modules (for data aggregation);
<Record Seeker> is the individual or organization requesting the data to which the directive applies. Although in a preferred embodiment, it is generally considered preferable that the Protected Data be "pulled" by a Record Seeker rather than "pushed" by a Record Holder, persons of ordinary skill in the art will appreciate that various systems of health data exchange are being used or have been proposed in which Protected Data is being pushed rather than pulled. To the extent that the ontology is applied to such an instance, the party or entity receiving the Protected Data is nevertheless referred to as "Record Seeker." The Record Seeker generally consists of a specific record seeker (such as a single person or globally unique device), record seeker group, record seeker role, and/or composite role, that effectively enumerates in a non-ambiguous manner individuals, organizations, groups, affiliations, roles and/or any combinations of these. As with Record Holders, in a preferred embodiment, Record Seekers would be identified using constrained lists and widely accepted standards, that persons of ordinary skill in the art will understand may be identical to that employed for Record Holders; and <Pre-Conditions> are other factors accompanying the directive that can be used to help determine the correct data sharing decision. By way of non-limiting example, these may include the purpose of use, time period, minimum authentication requirement, state of consciousness, requirement for securing prior express consent. As with each of the foregoing elements, to the extent that there is wide agreement on the terminology, this is likely to be beneficial. In this regard, one non-limiting example of a standard addressing purpose or use is OASIS' Cross-Enterprise Security and Privacy Authorization (XSPA) Profile of Security Assertion Markup Language (SAML) for healthcare.

Persons of ordinary skill in the art will appreciate that this semantic expression is an important component of the system and method that enables individuals to protect (or as may be the case, to share) his or her private data. In a preferred embodiment, the system is designed to be orthogonal and to allow for interoperability, extensibility, security, platform independence, standards independence, and high granularity. Additionally, in a preferred embodiment, no personally identifiable information (or PII) will be stored within the ontology. Rather, as noted previously, the private access bureau's privacy directive (PD) engine consumes the ontology to render consent decisions regarding the movement of data that is "loosely coupled" through the use of GUIDs, DOIs, Handles or the like. Thus, at the heart of the private access bureau, the system will be responsible merely to execute and determine the applicable and effective directives given a request for data access to a uniquely identified data element.

Persons of ordinary skill in the art will also readily appreciate that the foregoing ontological statement can be used to convey a nearly infinite level of granularity—from as broad as reflecting the policy for every book in the Library of Congress, to as detailed as a single pixel. In a preferred embodiment, each user of the system is able to set his or her respective level of preferred granularity, and in accordance with the teachings of applicant's co-pending U.S. patent application Ser. No. 13/075,344, entitled "System and Method for selectively redacting information in electronic documents" to redact, if desired, certain fields within documents and to enable the use of Internet-based search in accordance with applicant's earlier filed U.S. patent application Ser. No. 09/025,279, filed on Feb. 18, 1998, now U.S. Pat. No. 7,028,049, entitled "Standing order database search system and method for internet and intranet application." Thus, while this decision is inherently optional, it is preferable that privacy preferences be used to distinguish, at a minimum, between instances in which (a) the data for an individual excluding any PII may be searched, accessed, used and/or shared; (b) instances in which the corresponding PII may additionally be searched, accessed, used and/or shared; and (c) instances in which the PII may be used for making contact with the data subject.

Continuing with FIG. 4, it will be seen that Federal laws, State laws and institutional policies applicable to information privacy are communicated, in a preferred embodiment utilizing the foregoing ontological elements, by a Federal law user agent 1210, a State law user agent 1212, and the institutional data holder 1214, respectively, to a policy repository 1216 via network 1208'.

Various third party privacy-enabled systems and privacy-assured applications 1220 such as, illustrated therein, a privacy-enabled records system and a privacy-enabled search system require users to login 1221, 1221' and invoke commands to open a patient record 1223 or submit a search query of the patient record(s) 1223'. When a request for a document or search query is received from a third party privacy-enabled system or privacy-assured application 1220, the private access bureau 1218 filters applicable policies 1222 included in the policy repository 1216 and filters applicable individual privacy preferences 1224 included in the privacy preferences repository 1206 to identify policies and privacy preferences related to the requested document or data.

The privacy bureau 1218 performs a directive and policies conflict detection step 1226; and to the extent any conflicts are thereby detected, includes an adjudication step 1228 that seeks to resolve these conflicts, if any, between applicable individual privacy preferences, laws, regulations and/or institutional policies, for example, to establish the privacy directive 1229 to be applied to a requested document or data. When the superior adjudicated outcome of adjudicator resolution 1228 indicates that a patient's express consent is required before providing access to a document or information, and the patient's privacy preferences so permit seeking this input by the patient (the data subject), the adjudicator 1228 communicates a request for the patient's consent to the patient 1202 via a network 1208". Patient 1202 is then provided an opportunity to dynamically update her privacy preferences from any Web browser 1203 or web-enabled mobile application such as described in FIG. 7, preferably by clicking within user interface 1231 on "green" to permit, "red" to decline, and "yellow" to defer or condition such response.

This action produces an additional privacy preference 1204 by the patient 1202 that is added to the privacy preferences database 1206 in the manner described hereinabove and, in turn, provides the basis for updating the decision from the adjudicator 1228. This, in turn, generates privacy directive 1229, which is communicated to the privacy-enabled system or privacy-assured application 1220 via a network 1208'''. Upon receipt of privacy directive 1229, a corresponding message 1230 appears within the third party privacy-enabled system or privacy-assured application 1220 to verify that the system user has a right to see and/or access the requested record or data on the basis of such privacy directive. In the event that the privacy directive serves merely as a recommendation, the message may inform the system user of the results of the private access bureau process and require that the user decide on one or more manual actions based upon such advice. In a preferred embodiment, wherein the privacy directive additionally serves as an enforcement point in such privacy-enabled system or privacy-assured application, the system would automatically take such input into account by either providing the requested action or foreclosing it in a manner that is in accord with such privacy directive 1229.

Privacy directive key 1229' summarizes with regard to an illustrative embodiment, the basis for n indication such as a green light, red light or yellow light representing the extent of the data seeker's right to access, view and/or receive the requested data. For example, a green light may signify that (1) "private access" is granted to the record seeker according to a data subject's privacy preference, for example that the data seeker is a particular researcher who is expressly granted the right to receive the PII whereas on the basis of law or institutional policies absent such express consent, that person or entity would not have such right; or (2) no "private access" has been granted but an authority permits access without the data subject's consent, for example, in an emergency medical circumstance, according to controlling Federal and State law, the medical records of the patient are accessible for treatment-related purposes by an attending emergency room physician irrespective of whether the patient consents or not to such access. A red light may signify that (1) the subject's privacy preference prohibits access by this data seeker and this privacy preference is not-over ridden by a controlling authority; or (2) an authority such as the applicable Federal or State law prohibits access without patient consent and no "private access" had been granted in the subject's privacy preference. A yellow light may signify that (1) an authority allows access without consent but a private access directive states a subject's preference to prohibit access; or (2) a level of uncertainty exists that requires further investigation (e.g., the adjudicator could not reach resolution). In the case of a yellow light wherein the adjudicator could not reach resolution, an illustrative embodiment of the invention provides reasons in message 1230 concerning why such resolution could not be reached including details under current law that may assist the data holder regarding how to address the circumstance notwithstanding this challenge in adjudicating to a clear resolution. Additionally, in a preferred embodiment, the system would prompt the data holder and other affected stakeholders in such a circumstance to participate in the enclosed channel private network 1901 or use case illustrations 1904 described in conjunction with FIG. 11. If at least a portion of the record is deemed accessible to the data seeker, the privacy-enabled application or system then opens the record or permissible portion of a requested record 1232, or opens proceeds of a search query 1233 for access by a requestor 1234, 1234'.

Applicant's co-pending U.S. patent application Ser. No. 13/075,344, entitled "System and Method for selectively redacting information in electronic documents" focuses on redacting certain fields or data elements within documents such that a portion but not the entire document may be accessible to some data seekers. It will be apparent to persons of ordinary skill in the art that the operation of the private access bureau supports the effectuation of these redacted fields. To the extent that the document incorporates redactions to designate that a portion (but not all) of a document may be disclosed to a data seeker, then the data holder will need to abide by such redaction requirements before sharing the document as a whole. In a preferred embodiment, the privacy-enabled records system or privacy-assured application employs the privacy directive to render the document 1234 giving effect to the intended redaction(s). However, in the event that the data holder's system does not provide this feature of a preferred embodiment, then the data holder must either manually redact the appropriate portions of the document based on system message 1230 before sharing it with the data seeker, or alternatively secure consent 1231 from the data subject in the manner hereinabove described such that the redaction is withdrawn and the entire document may be shared with the data seeker or withhold sharing the document on the basis of its not being in a position to carry out the requisite redaction.

The private access bureau 1218 also includes an audit handler 1236 that receives notification from the privacy-enabled system or privacy-assured application via a network 1208"", such as the Internet, when a privacy-enabled record or query is opened. The audit handler 1236 stores a record of the open record or query in an audit database 1238, which database is accessible by the patient 1202 via a network 1208""'. It should be noted that communication networks 1208, 1208', 1208", 1208''', 1208"" and 1208""' may be the same or separate networks.

Figure 5:
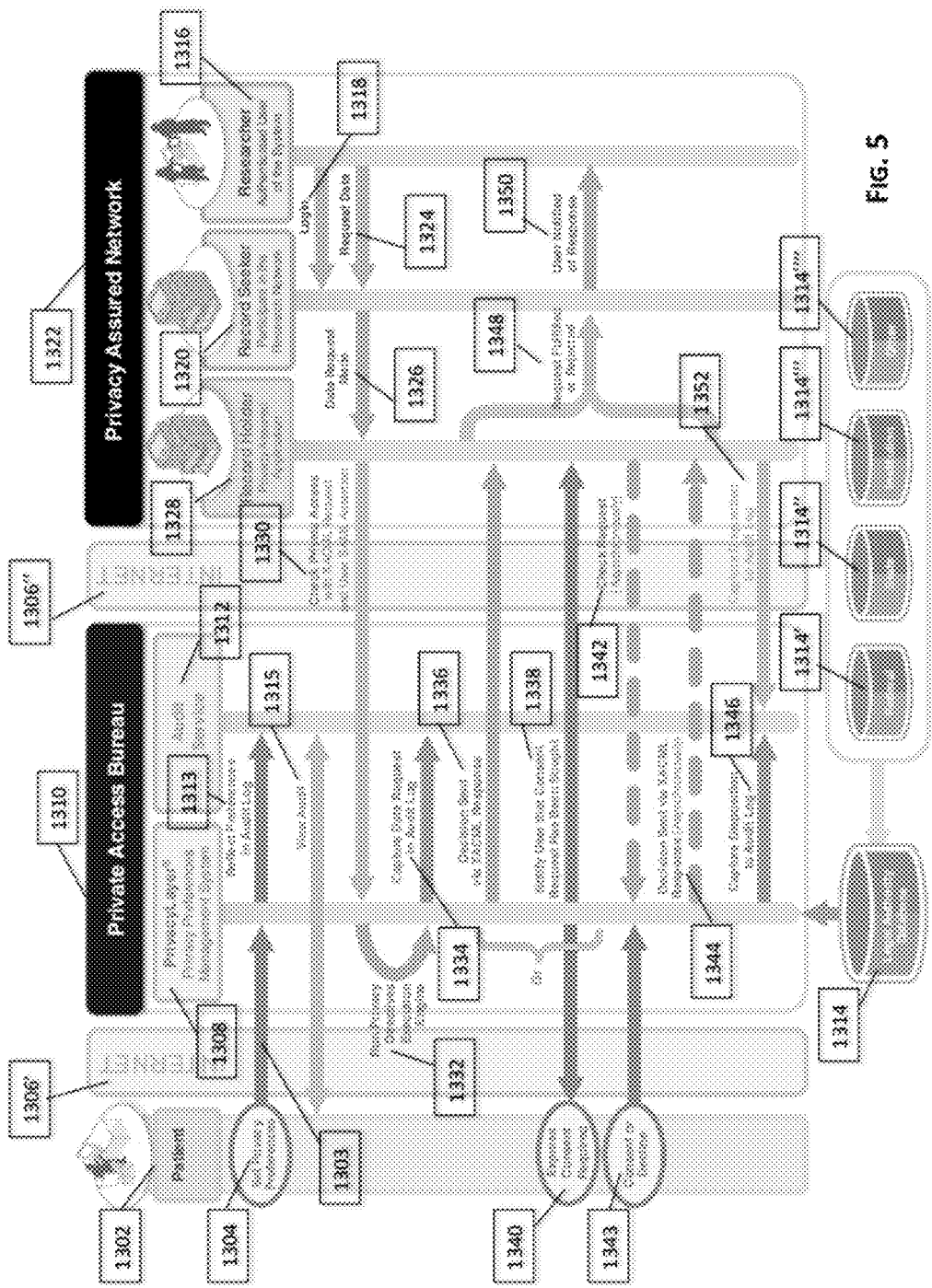
FIG. 5 is a sequence diagram showing the interaction between a party requesting data from a privacy-enabled system, the private access bureau and the patient for controlling the release of information by an enterprise in accordance with the teachings of the invention.

Turning next to FIG. 5, an API call sequence is illustrated for the purposes of carrying out the teachings of the invention. In a preferred embodiment, the services of the private access bureau are exposed as integration profiles via stateless, reusable Enterprise Service Bus (ESB) services developed as adapters. Multiple binding adapters are implemented to accommodate multiple profiles and multiple bindings, i.e., SOAP over HTTPS, REST-full services, XML over HTTPs, and newer technologies that supplant these in the future. All API calls are secured using industry standard patterns such as WS-Trust, SAML and XACML, enforcing message authenticity, integrity, and confidentiality.

The illustrative API call sequence shows patient 1302 setting 1303 privacy preferences 1304 from any standards-based Web browser or Web-enabled mobile device connected via network 1306', such as the Internet, to the privacy preference management system (PPMS) component 1308 of private access bureau 1310. As previously described in conjunction with FIGS. 2 and 4, such privacy preferences 1304 are retained in the privacy preferences repository database 1206 (also 1004 of FIG. 2) that is connected to the PPMS. The PPMS is also connected to legal authority database 1314 (corresponding to policy repository 1216 of FIG. 4), which in turn contains policy directives, preferably in the ontology described above or another machine computable form, reflecting Federal law 1314', State law 1314", and institutional policies 1314'''. This architecture is extensible, such that if the private access bureau needs to take into account laws, rules, regulations or fees of other applicable jurisdictions such as international bodies, regional, county, city, trade affiliations or the like, collectively other 1314"", as part of the legal authority database, this is capable of being readily added.

Audit service 1312 is updated 1313 for the set preferences event 1303. Such audit service 1312 included within the private access bureau 1310 includes audit database 1238 of FIG. 4 (also 1016 of FIG. 2). This service provides an ability, at any time, for the patient 1302 to login to the private access bureau and view 1315 an audit history of events affecting data for which he or she is the data subject, preferably including privacy preference settings, authorizations, requests for access, and access to or sharing of that data or records from any privacy-enabled system or privacy-assured application. Additionally, patient 1302 can preferably subscribe to receive alerts based on updates to the audit service 1312 that affect the data and/or records of such data subject.

A researcher 1316 logs in 1318 and authenticates as an authorized user of the privacy-enabled system of record seeker 1320 within a privacy-enabled network 1322. Said researcher 1316 requests data 1324 using said record seeker's privacy-assured application or service, and upon receiving said data request 1324, record seeker 1320 initiates a data request 1326 from the actual record holder 1328. It will be apparent that such request may be systemic (such as when the researcher 1316 proposes to open a record for a specific patient on a hospital records system that in turn must access that record from a second hospital's database within the network). Or, alternatively, such request may be inquiry-based (such as when researcher 1316 initiates an inquiry utilizing a privacy-enabled search engine to locate any document containing one or more keywords or concepts that are located on any of the servers whose data is searchable and may be retrieved provided that this is in accordance with applicable privacy directives), and that in turn produces in response a list of documents fulfilling the search parameters, each with a hypertext link to the record holder assuming that the data holder has the right to make this information available to it.

Before responding to such request for access, or to such request for search results responsive to such an inquiry, record holder 1328 initiates a SAML assertion 1330 to the private access bureau. Upon receipt by the private access bureau 1310 of such inquiry, the PPMS 1308 runs the privacy directives execution engine 1332 generally in the manner described with regard to the operation of the private access bureau 1218 in FIG. 4. The system captures the data request event 1334 in audit service 1312; and if the inquiry is able to be answered immediately based on the database contents of the privacy preferences and legal authority database, responds to record holder 1328 via an XACML statement 1336 with a privacy directive (as illustrated by directive response 1014 of FIG. 2 and described with respect to 1229 and 1229' of FIG. 4).

Alternatively, if the request is not capable of being answered without input by the data subject, then a notice of its processing status having been pended 1338 is sent via network 1306" to record holder 1328 and a request for express consent 1340 is sent via network 1306' to the patient 1302. Audit service 1312 is simultaneously updated so that in the event record holder 1328 wishes to check the status 1342 of the decision, this information is available to said record holder 1328 across network 1306" from audit service 1312. Subsequently, when patient 1302 consents or declines 1343 to permit the proposed action in the manner hereinabove described, this response updates the privacy preferences repository database 1206 of FIG. 4, updates the audit service 1312, and communicates a privacy directive 1344 to record holder 1328 via an XACML statement over network 1306". Because this action requires an intervening action by patient 1302 (or timing-out of the system due to the failure of the data subject to timely respond), the step of communicating privacy directive 1344 to record holder 1328 is shown as taking place asynchronously. Additionally, the fact of the privacy directive 1336 or 1344 having been sent to record holder 1328 is recorded in a capture disposition event 1346 update to the audit service.

Upon receipt of the privacy directive 1336 or 1344, as applicable, record holder 1328 is able to consider the recommendation communicated therein and thereafter fulfill or decline to fulfill 1348 the data seeker's request. Accordingly, in the example given above of the privacy-enabled record holder system, record holder 1328 is able to provide (or on the basis of not having adequate privacy permissions to do so), decline to provide, the requested document; and in the second example of a privacy-enabled search engine, record holder 1328 is able to display the permissible search results. This is reflected on the record seeker 1320 system, which in turn notifies 1350 researcher 1316 and carries out the corresponding action.

Figure 6:
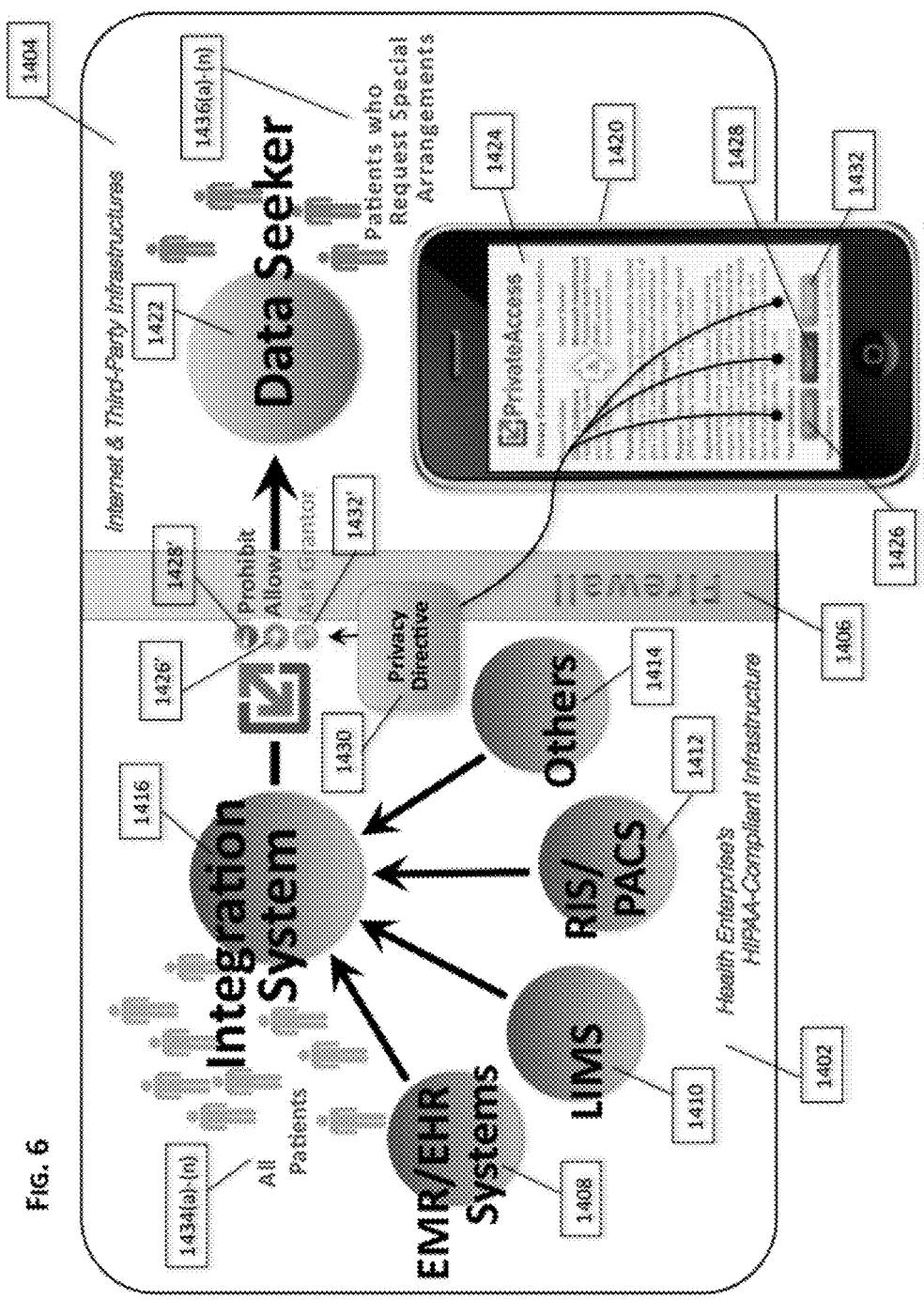
FIG. 6 is a simplified illustration showing the effect of the patient setting privacy preferences to manage the sharing of data in accordance with directives of the private access bureau and in turn controlling the release of information by a privacy-enabled enterprise.

FIG. 6 provides an illustrative case to show how the foregoing disclosed system and method helps to manage the sharing of data based on privacy directives issued by the private access bureau that in turn establish the basis for controlling the release of information by a privacy-enabled enterprise such as record holder 1328, including to one of more third-parties outside the enterprise. Such health care data holder 1401 (not pictured) is shown to have a HIPAA-compliant infrastructure 1402 that is protected from the broader network 1404 by firewall 1406, institutional policies, and other conventional security mechanisms. Within the enterprise's protected environment 1402 are a variety of disparate systems and services that automatically or by direction of system users create, store, transmit, access and/or use private data of patients. Typically, a large data holder such as a hospital network will include a variety of data systems and sources across sites of care (inpatient, ambulatory, home), domains (clinical, business, operational), technologies (text, video, images), and different vendor systems, including one or multiple EHR/EMR systems 1408, laboratory information management systems (LIMS) 1410, Radiology Imaging System/Picture Archiving and Communications Systems (RIS/PACS) 1412, and other systems 1414.

Historically, these multiple systems have resulted in data silos—often, even within a single enterprise—and this challenge is magnified in the nation's current efforts to interconnect disparate enterprises' data and information technology systems. To address this challenge and provide the benefits of greater health information sharing, systems are available for health enterprises (or collaborations of multiple health enterprises) to better integrate such data. For example Microsoft® Amalga, HealthVision's Cloverleaf, and Antellio's PIE products each assist an enterprise to aggregate data from various clinical, laboratory, financial and administrative systems in order to permit a comprehensive consumer-centric view that includes, for example, test results, imaging procedures, lab results, dictated reports of surgery, as well as patient demographics and contact information. Additionally, a number of health information exchanges (HIEs) have built and are building networks of health enterprises, and numerous standards bodies and industry committees, including private and government-sponsored initiatives, have developed and seek to develop data standards to help reduce such integration challenges within new HIT hardware and software systems. The goal of these various integration systems 1416 is to increasingly integrate the data within the historical silos of information. Even though in FIG. 6, integration system 1416 is shown as being a system such as Microsoft Amalga, persons of ordinary skill will appreciate that similar principles to those described herein will generally apply to other instances wherein an integration system represents a junction point for the exchange of data between nodes on the network such as is the case with HIEs, RHIOs and the like.

In accordance with the principles of the invention, one of the core functions of the private access bureau is to enable a patient (i.e., such as patient 1102 on FIG. 3) from a standards-compliant Web browser or Web-enabled mobile device such as smart phone 1420 to easily and unambiguously communicate with health enterprise 1401 concerning her wishes as to sharing her personal data that said enterprise 1401 is holding on one or more of the systems within the protected boundaries of its infrastructure 1402. For example, in the event that enterprise 1401 proposes to share a clinical encounter summary with a third party data seeker 1422, the private access bureau alerts said patient in the hereinabove described manner concerning the need for her express consent. Upon receipt of such notice, preferably accompanied by an explanation of the reasons for the proposed action, the patient may indicate her approval or disapproval via user interface 1424, by clicking on consent button 1426 or decline button 1428, respectively.

On this basis, in the manner described with regard to FIGS. 4 and 5, above, the private access bureau will generate privacy directive 1430 to allow 1426' or prohibit 1428' the data from being used or shared in the manner described. Alternatively, as discussed in conjunction with FIG. 7, below, the patient may click on one or more hypertext links to view or request additional information, or select snooze button 1432 in order to be reminded at a later time.

In a preferred embodiment, the private access bureau also permits the patient to initiate the proposed transmittal to a third-party entity, such as a Personal Health Record or other entity. To the extent that such record exists in an electronic form, in accordance with the principles of the invention and as required under HITECH from and after a designated implementation deadline, the records can be transmitted electronically by health enterprise 1401 or may be sent as "a paper record," preferably with a tracking code for such transmittal being entered (for example, in a preferred embodiment, through an integration of the private access bureau with a courier system's automated tracking systems) or manually.

Persons of ordinary skill in the art will appreciate the substantial difference that exists between the foregoing approach and systems such as the BlueButton® Initiative announced in August 2010 and other vendor-tethered systems wherein the means of granting such request (or conducting such authorization action in response to an alert) is limited to a single data holder or data seeker system. Thus, in one preferred embodiment, enterprise 1401 provides a free private access bureau account to all of its patients 1432(*a*)-(*n*) as part of registration and as a supplement to the required HIPAA Notice disclosures process, with those patients who already have a private access bureau account utilizing it to grant data disclosure authorizations appropriate to their reasons for being attended by said health enterprise. This has the advantage of permitting each account holder's identity to be verified and witnessed by an employee of enterprise 1401, in turn providing an added means to help reduce the chances of error or identity fraud.

Once such private access bureau accounts exist, the patient is able to declare whether she wishes for data to be shared in various ways and, if she would find this helpful, to receive independent perspectives on doing so based on conferring with a trusted guide 1105. Thus, the enterprise has a ready means to present to patients 1432(*a*)-(*n*) opportunities for data sharing that some patients may view as being of benefit and others might prefer to decline. Among other things, these include authorizing the transfer of certain records into a third-party PHR such as Microsoft HealthVault or a different system designated by the patient, authorizing data to be accessible for research and/or clinical trials recruitment purposes; consenting to organ donor programs and voluntary data registries, and the like, and in which case only the subset of patients wishing such special data sharing arrangement 1434(*a*)-(*n*) may voluntarily elect to participate.

FIG. 7 provides a mobile device for carrying out the principles of the invention, and consists of three sub-parts. The first, FIG. 7(*a*), illustrates a two-dimensional Quick Response (QR) code 1502 that would be utilized in an optional preferred embodiment for instances such as described above in which a large data holder wishes to give its patients free private access bureau accounts as an integral part of its operating processes. In such a case, use of QR code 1502 (once properly encoded) would enable such organization to transfer data such as information collected or verified during the registration process to the patient along with an automatic upload of the free user application to the data subject's Web-enabled mobile device 1504. The use of such QR code 1502, has the advantage of fast readability and comparatively large storage capacity, making it possible for the institution to convey to the end user a pre-configured application, thereby leading to much higher acceptance rates since all the user would need to do is take a picture of the QR code and follow the prompts to download the application, confirm that the data previously recorded by the employee of the enterprise was accurate, accept the terms of use, and then immediately begin to set their privacy preferences. This is anticipated to make it much faster and easier for patients and other consumers to embrace, but at the same time without this being a major delay in the business operations of the entity such as data holder 1328. Another advantage is that location-based technology on said mobile device may be used to demonstrate that the registration occurred in the presence of the witness at the institution and as an additional protection against identity theft and/or medical records fraud, and to assure proper documentation exists in the case of legally authorized surrogate representatives.

Splash screen 1506 describes, from a consumer's perspective, several key features and benefits of the private access bureau. Button 1508 permits a consumer to see how the system works, and button 1510 invokes the sequence of events hereinabove described for downloading and configuring the application. Alternatively, the consumer version of the system may be downloaded from a traditional apps store, by clicking on a hypertext link in an email message and/or on the sponsoring institution's website, and other conventional means. Additionally, similar features to those illustrated in FIG. 7 with regard to a mobile application are available through a standard, consumer-facing Web portal for the private access bureau and that may be accessed using a standards-based browser.

Following registration, the data holder or their legal representative is preferably presented with privacy preference options pertaining directly to the transaction in which the patient is engaged. Thus, for example, in connection with authorizing possible transmittal of some portion or all of her medical records as described in connection with FIG. 6, the patient would be presented the options shown in interface 1512 (which is an larger version of 1424, described above). In a preferred embodiment, the interface describes the reason the patient's attention is required, such as subject line 1513, "Privacy Concern Requires Your Attention" and a brief description of the issue requiring attention, which in this non-limiting example is the proposed sharing of data from record holder 1514 to a specified record seeker 1516. Icon 1515 indicates at a glance that the patient's attention is required, and the direction of movement of her private data. In a preferred embodiment, the interface also identifies any important financial terms 1518, such as an indication of any costs that the service charges or any revenue-split to which the data sharing may entitle the data subject. The interface also provides a written summary of the pending action 1520, including the data subject's name 1521 (including the opportunity to change it if different than show, such as in the case of a parent having one account for themselves and for their children). It also provides a summary of the purpose 1522 that can contain one or more hypertext links to read more information, see ratings by other consumers, and the link. Additionally, it provides an explanation 1524 concerning why the privacy alert was triggered, including whether this is dictated by an earlier privacy preference setting such as 1432' in FIG. 6. The interface also includes context-sensitive primary action keys, each preferably color-coded to reinforce the proposed action. In the case of this example, these are consent button 1526, decline button 1528, and snooze button 1530, each described above in connection with the corresponding buttons 1426, 1428 and 1430 and FIG. 6. In one embodiment, the interface includes a link 1532 to read more about each alternative, including in a preferred embodiment the opportunity read testimonies of guides and other experts concerning the considerations that they consider important to the decision presented. Finally, it includes an opportunity to review by clicking on the historical data link 1534 to review existing privacy preferences and an audit record, from the audit database 1238 of FIG. 4.

FIG. 7(*b*) is a continuation that illustrates two additional interface screens that further describe this aspect of the invention.

Interface 1542 illustrates an interface for use in connection with granting rights to a specific person to access records regardless of source, such as may be useful in conjunction with providing a complete medical history in the process of scheduling an appointment as described with respect to FIG. 9, or in response to an alert triggered by a search request in using a privacy-enabled search engine as described with respect to FIG. 10 below. Subject line 1543 indicates the reason the patient's attention is required. Record seeker identification 1544 indicates the data seeker (as hereinabove defined) to whom such access rights grant is proposed. Helpful links 1546 provides information that may assist the data subject in deciding whether, and the extent to which, to grant access rights to this data seeker. Trust score 1548 represents a rating of the trust-worthiness of this record seeker, which persons of ordinary skill will understand may be generated based on objective data and ratings provided by other data subjects who have experience with the person or entity and how well they were treated. Similar to Amazon.com book reviewer ratings or eBay seller ratings, these star ratings may be supplemented by the opportunity to read what others have said 1550. Additionally, link 1552 provides an opportunity to read what others have said about this sort of data sharing generally, and the benefits and risks associated that a prudent party may wish to take into account before making a decision. In a preferred embodiment, the interface also identifies any financial terms 1554, and provides a written summary of the pending action 1556, including the data subject's name, as described above with regard to 1521. It also provides a summary of the purpose 1528 that can contain one or more hypertext links to read more information, and an explanation 1560 concerning why the privacy alert was triggered. Context-sensitive primary action keys, consent button 1562, decline button 1564, and snooze button 1566, and historical data link 1568 are also shown, and function generally in the manner previously described.

Interface 1572 illustrates an interface for use in connection with granting rights to a specific person or entity to access otherwise private data in connection with clinical trials recruitment, including in conjunction with applicant's co-pending U.S. patent application Ser. No. 12/750,036, entitled "System and method for recruiting subject for research studies and clinical trials over the internet." Subject line 1573 indicates the reason the patient's attention is required. Researcher identification 1574 indicates the data seeker (as hereinabove defined) to whom such access rights grant is proposed. Helpful links 1576 provides information that may assist the data subject in deciding whether, and the extent to which, to grant access rights to this data seeker. Shown herein is a link 1578 to read more about the researcher and 1580 to read more about the research conducted by them. Other links and tools such as trust score 1548, testimonials similar to those described with respect to links 1550 or 1552, and financial terms 1554 may be also be useful and may be included in an optional preferred embodiment. The interface also identifies 1582 the data subject to whom it pertains, provides a summary of the purpose 1584 and 1586 that can contain one or more hypertext links to read more information, if desired.

It also provides an explanation 1588 concerning why the privacy alert was triggered and includes context-sensitive primary action keys, consent button 1592, decline button 1592, and snooze button 1594, as well as link 1596 to read about these alternatives, as described with regard to link 1532 above.

FIG. 7(*c*) illustrates yet another interface screen 1602 that may be used in conjunction with carrying out another optional preferred aspect of the invention, and in particular enabling each consumer to locate, gain control over his or her personal data and records held by third-parties, and to the extent he or she wishes, to cause this information to be searchable through privacy-enabled search and/or to obtain or direct to third-parties one or more copies. Accordingly, subject line 1603 indicates the reason the patient's attention is required, herein illustrated as being to "Inform Record Holders of [the Patient's] Privacy Wishes" and interface 1602 illustrates a simplified way, from a single interface, that the patient can make a request to collect all of her medical records, or in a preferred embodiment to set her privacy preferences over such records. At the user's discretion, the user may request copies of some or all of these records, direct copies to be sent to third-parties, and/or let the information remain in their present location but authorize it to thereafter become searchable in accordance with the patient's wishes.

In this regard, notation 1604 indicates that the purpose of the proposed action is for the user to grant authority for the private access bureau to perform as a designated agent in making contact with record holders 1606. Icon 1605 indicates that this action requires express approval by the person(s) listed, or by their legally authorized representative. Persons of ordinary skill in the art will recognize that within certain jurisdictions and for some recipients of such agent designation, this action may require additional paper-based authorizations and/or confirmation steps that, depending on jurisdiction, must be witnessed by a third-party and/or notarized in advance of submittal. In such instances, in a preferred embodiment, the system would prompt the user to enter all of the pertinent information into the system, automatically enter these in the appropriate legal form and format using a templates directory for such authorities, and instruct the user what additional steps are required. For example, the system might prompt the user to print and bring the completed form to a notary public, and provide them with a physical address and/or fax number to send the form, once properly notarized.

The list of record holders 1606 can be prepared in a number of ways. Among these, the names can be manually entered by the user from his or her records or selected from a pick-list provided by the system. Once the user has entered a stakeholder, such as his or her insurer, the system may recognize and present for the user's consideration any parties who have made a claim against the patient's insurance over a designated period of time. It will be apparent how this "reverse claiming" method can be employed with a variety of other stakeholders. Another means for populating the list of record holders 1606 may be based on entities and/or individuals appearing in a Lexis/Nexis, consumer credit bureau, or data aggregator report for the individual, which generally identifies parties with whom there are established accounts and/or some sort of activity. Additionally, there are several fields where the market share of various vendors is so substantial that one or a few of just a handful of possible firms exist, with whom the user is likely to have had contact. And for these entities, a preferred embodiment may broadcast a request once authorized to do so by the user, asking that if they have records that they so indicate, such that the user may decide whether he or she wishes to add these to list 1606.

Figure 8:
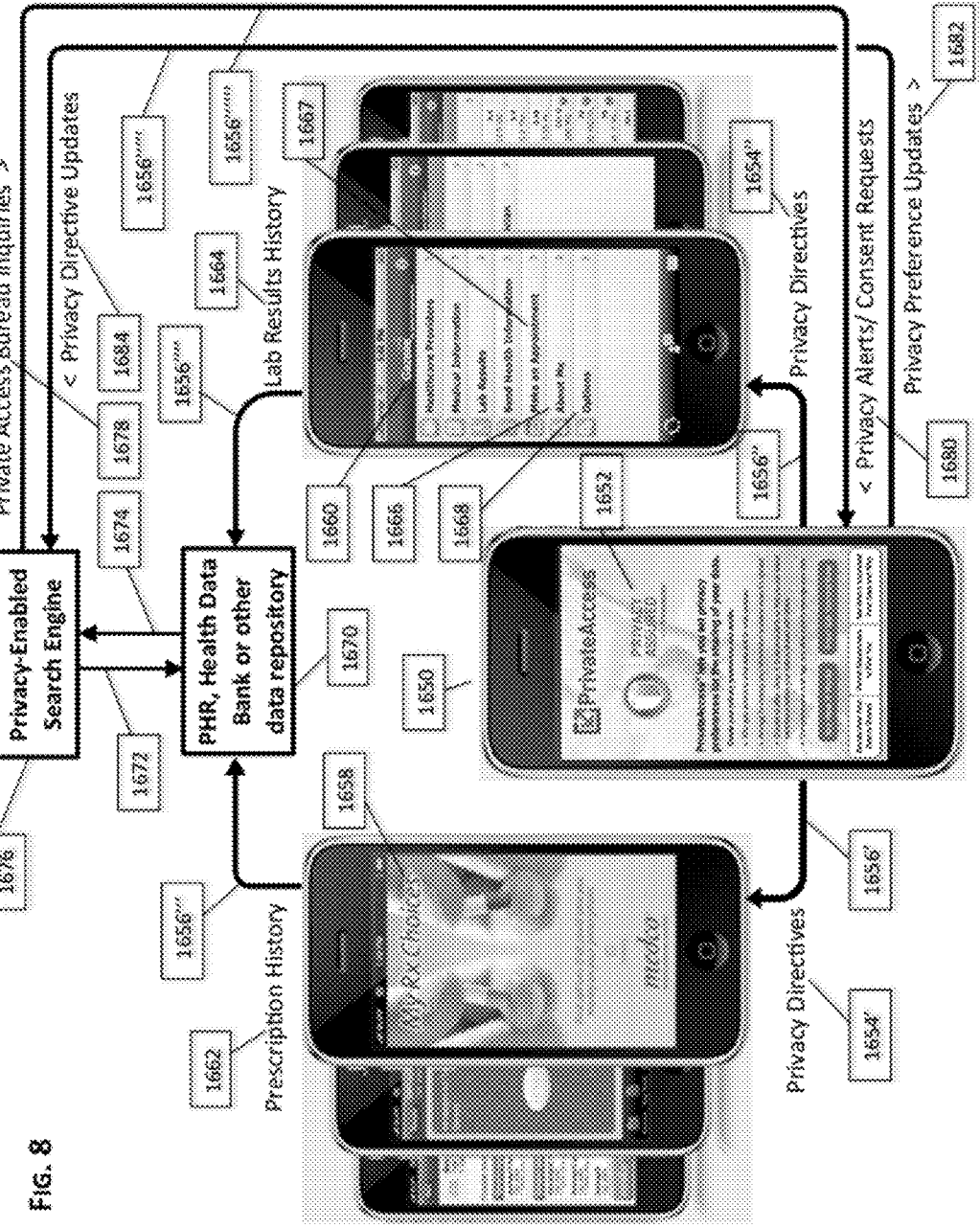
FIG. 8 is a simplified illustration showing the effect of the patient setting privacy preferences to proactively manage the sharing of data by other data holders.

As shown, the record holders list 1606 is preferably grouped into a number of intuitive categories, thereby making it easy for a user to indicate preferences as s a group. Each category preferably includes a number 1608 that designates the number of individuals presently in that category, and hypertext links for viewing 1610 the more detailed list as well as for editing (e.g., adding, deleting and/or revising the listed contact information) 1612 the list. The interface also identifies 1614 the reason (including the data subject) to whom it pertains, and provides a summary of the purpose 1616. It also provides an explanation 1618 concerning the proposed action and context-sensitive primary action keys, including consent button 1620, decline button 1622, and snooze button 1624, as well as link 1626 to read about these alternatives, and other options. Those of ordinary skill in the art will recognize that various authorities provide the right to the data subject to specify that manner in which they with the data to be treated, which may in turn trigger voluntary, best-efforts based and/or mandatory action by the data holder. For example, whereas under HIPAA, the Turning next to FIG. 8, a simplified illustration shows the effect of the patient setting privacy preferences generally as described in the foregoing examples to effect and manage the sharing of data by other data holders in accordance with the teachings of the invention. A data subject's Web-enabled mobile device 1650 (corresponding to device 1504 in FIG. 7(*a*) above) is running a mobile version of interface 1652 of the private access bureau. In the manner described in respect to FIG. 7(*c*), the data subject sends privacy directives 1654' and 1654" to various record holders—in the case of this illustration, including a major pharmacy benefits provider and a major national testing laboratory—via a network 1656' and 1656" such as the Internet. In the case of the data holders selected for the foregoing illustration, both firms have already developed and currently offer mobile interfaces (pictured as 1658 for Medco and 1660 for Quest Labs, respectively) that give patients an opportunity to create user accounts, receive medical information, obtain pricing, place orders (in the case of prescriptions) and make appointments (in the case of lab procedures), set reminders, and growing list of related features and functions. In both instances, these vendors currently provide patients the opportunity to download in Acrobat® a copy of their prescription history 1662 and laboratory test results 1664 respectively, and at least one of the firms offers the ability to upload this information to Microsoft HealthVault, a PHR.

However, these actions must be managed directly from a website or mobile application for the respective vendor and the selected PHR. In turn, this can require considerable effort by a patient, particularly when one appreciates that each patient may have several dozen (or more) such relationships. Thus, even if each company offers similar capabilities now or in the future, the account setup, website designs and configuration of appropriate settings for each of these firms are all somewhat different, time-consuming, and for some consumers, difficult to learn and recall one site to the next. This is particularly true for the elderly and persons who are chronically ill, who on the one hand could benefit the most from this sort of system; and at the same time are the least likely to use a system that requires logging into, establishing online accounts at, and managing multiple websites. Moreover, consumers—and particularly patients—are often frustrated by needing to respond to essentially the same basic questions about themselves and their medical history 1666 and their basic user preferences 1668 with each new vendor and provider.

In accordance with one preferred embodiment of the invention, all of this complexity is instead managed from a single, simplified user interface 1652. The operations of the private access bureau mask the complexity and variability of interface design, and to make certain that the patient only has to answer the same question (such as their name and whether they authorize marketing by affiliated entities, etc) once and that this data is re-used (or customized and used, if the patient prefers) across all of the sites.

Thus, upon acceptance of the agency representation issued by the data subject having selected, for example, consent 1620 in FIG. 7(*c*) and receipt of a privacy directive authorizing transfer of such information as a result of the data subject having selected consent 1526 in FIG. 7(*a*), these data holders respond by sending the requested data via a network 1656''' and 1656'''' such as the Internet to the data repository location 1670 specified by the data subject. Without limiting the foregoing, such data repository location 1670 may be a PHR, a health records data bank, a personal information manager, or any other properly configured facility that the patient is comfortable establishing and/or designating to hold this sort of information. In connection with the foregoing, it should be noted that one provision of the HITECH Act gives the patient a legal right to instruct any data holder to provide this information to the patient or to the party to whom the patient directs; and at all times following an implementation deadline, each data holder is required to comply with this request. As noted above, although the foregoing steps are illustrated based upon using mobile device 1650, each can similarly be initiated from a patient portal for the private access bureau via a standards-based Web browser.

If authorized by the records subject, said data repository 1670 may in a manner that is well understood by persons of ordinary skill in the art of database search engines, allow certain of its records to be periodically crawled 1672 (and/or otherwise submit the data contained therein) to be indexed 1674 by one or more privacy-enabled search engines 1676. In accordance with the teachings of the invention, such privacy-enabled search engine 1676 is able to permit property authenticated persons (or bots) to search for relevant data by making queries from any standards-based Web browser or Web-enabled device, and receive search results as and when authorized by the then applicable privacy directives.

As described hereinabove, in applicant's issued patents and other co-pending filings, and in connection with FIG. 10 below, in certain cases, receiving the desired results from such search queries may require the express authorization of the data subject before the results of a search query may be returned to the individual searcher. Such private access bureau inquiries 1678 are sent via a network 1656'''' such as the Internet, and are shown through the actions of the private access bureau to result in privacy alerts (e.g., consent requests) 1680 that appear on user interface 1652 of the data subject's mobile device 1650 or corresponding browser interface-based alerts. The responsive action taken by the data subject, such as clicking on consent button 1562 or 1590 of FIG. 7(*b*) in order to dynamically make updates to his or her privacy preferences 1682 are communicated via network 1656''''' such as the Internet to the private access bureau. These updates will correspondingly, and through the operation of the private access bureau as described hereinabove, result in updates to the privacy directives 1684 effecting disclosure (or not) of search results via such one or more privacy-enabled search engines 1676.

Although the foregoing disclosure describes the use of data repository 1670 to aggregate data from a variety of sources, one of the advantages of the invention is to make it possible for the data to rather remain at the location of each data holder.

In this one optional preferred embodiment, each data holder would permit the privacy-enabled search engine 1676 to crawl and index information on said data holder's web server. This offers a number of advantages as have been previously discussed in applicants various filings and co-pending applications.

By way of another non-limiting example, the hereinabove described invention offers potentially significant advantages over the present state of the art in the field of social media. Persons of ordinary skill in the art of social media will readily appreciate that there is increasing concern by consumers, regulatory agencies and advocacy groups surrounding privacy in this field. Social media applications have become the poster child for the problems of the industry, including concerns about online tracking, location-based tracking, use of personal data without permission, and frequent changes to the company's privacy policy and privacy controls. By design, most social media privacy policies and privacy settings are vague, confusing and subject to change, including returning the settings back to the "default" levels which require users who are concerned about privacy to figure out how to configure new user interfaces and reinstate their earlier settings each time the company changes its system. In general, consumers don't trust social media applications to have their privacy interests at heart. And this is not an isolated problem, in part as a result of the reasons described in the Background section above.

The private access bureau ported through social media applications in accordance with the teachings of the invention provides users the opportunity to set all of their privacy settings from a single interface, and to receive alerts whenever their social media provider institutes changes that require these settings to be updated. The system is able to utilize trusted guides, crowd sourcing and "friend" referrals regarding desirable privacy settings and strategies, as well as explanations and comparative ratings for why these are preferred over other approaches. Once instituted by a user, these same settings—and the underlying principles upon which the granular setting are based—can apply to a user's social media application and, similar to the method described above, be re-used (or customized and used) as the basis for other popular websites. This will provide the advantages described herein associated with setting one's privacy preferences once and managing these privacy settings across multiple websites and domains where ones personal data is held from a user interface that is designed to make privacy as simple and intuitive as possible, and that includes active alerts when privacy concerns require the user's attention.

FIG. 9, consisting of subparts 9a and 9b, provides a block flow diagram indicating the integration in a preferred embodiment of Internet-based systems for scheduling an appointment with a medical professional, searching for relevant information in order to make the appointment most highly productive, and accessing the private access bureau to determine when such information may be shared, including in a preferred embodiment in response to a search query from a privacy-enabled search engine, a privacy-enabled database, or a privacy-assured application. FIG. 9(a) provides an overview of the subject matter of applicant's previously filed patents, and illustrates the interrelation of online appointment scheduling 1702, creating a natural use case for online search for medical records 1704 and, in turn, one use for improve online privacy and access controls 1706, and the interrelations 1708' and 1708" thereof.

Figure 9B:
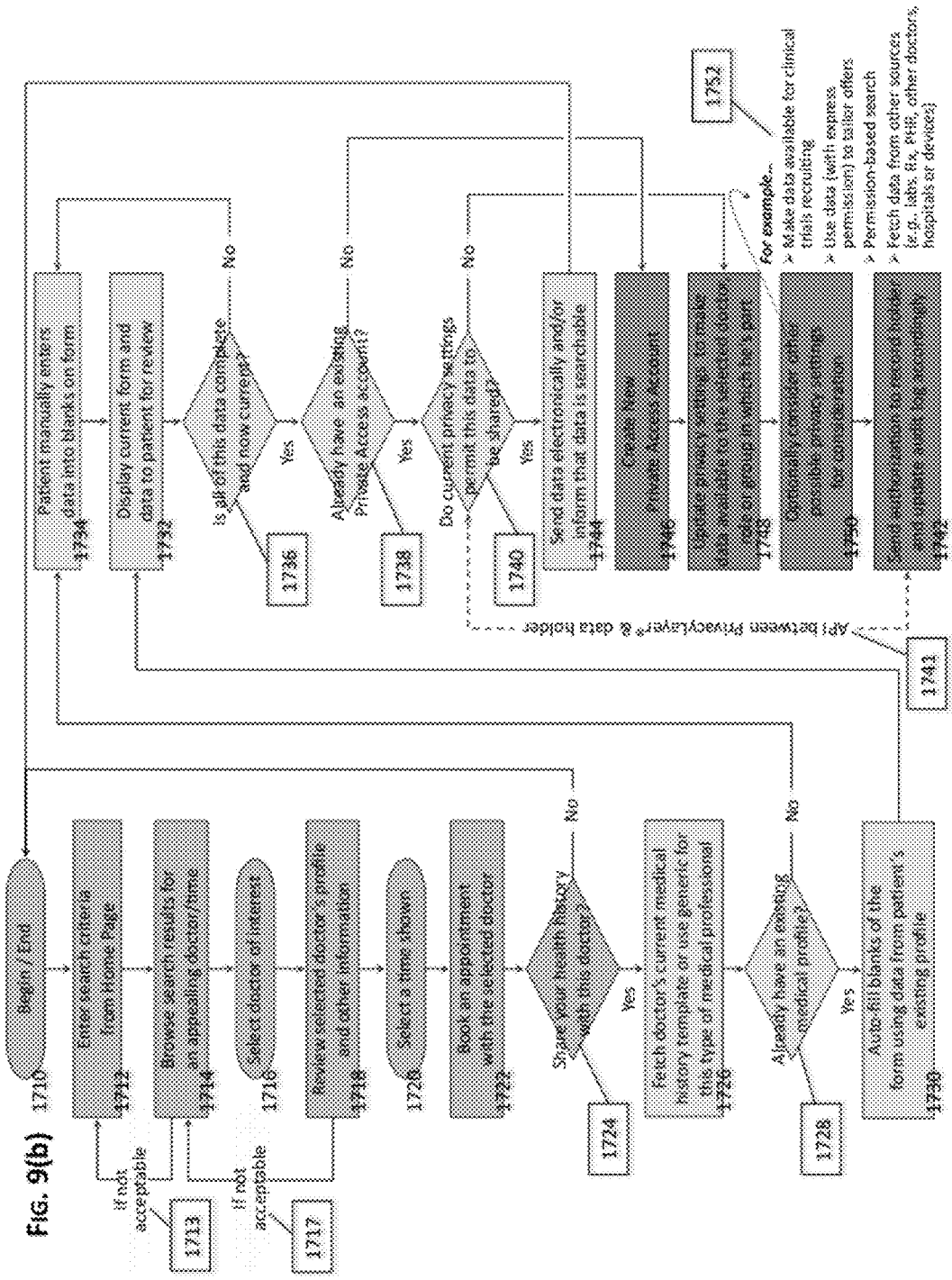
FIG. 9, consisting of subparts 9a and 9b, are block flow diagrams indicating the integration in a preferred embodiment of Internet-based systems for scheduling an appointment with a medical professional, searching for relevant information, and accessing the private access bureau to determine when such information may be shared or available in response to a search query from a privacy-enabled search engine.
Figure 10A:
FIGS. 10a through 10e are illustrations of search engine results screens illustrating the consequence of the actions of the mobile user interface functioning in concert with the private access bureau to make records responsive to such a query visible in such search results.
Figure 10B:
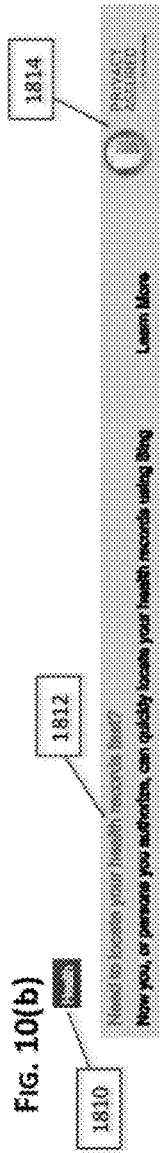
Figure 10C:
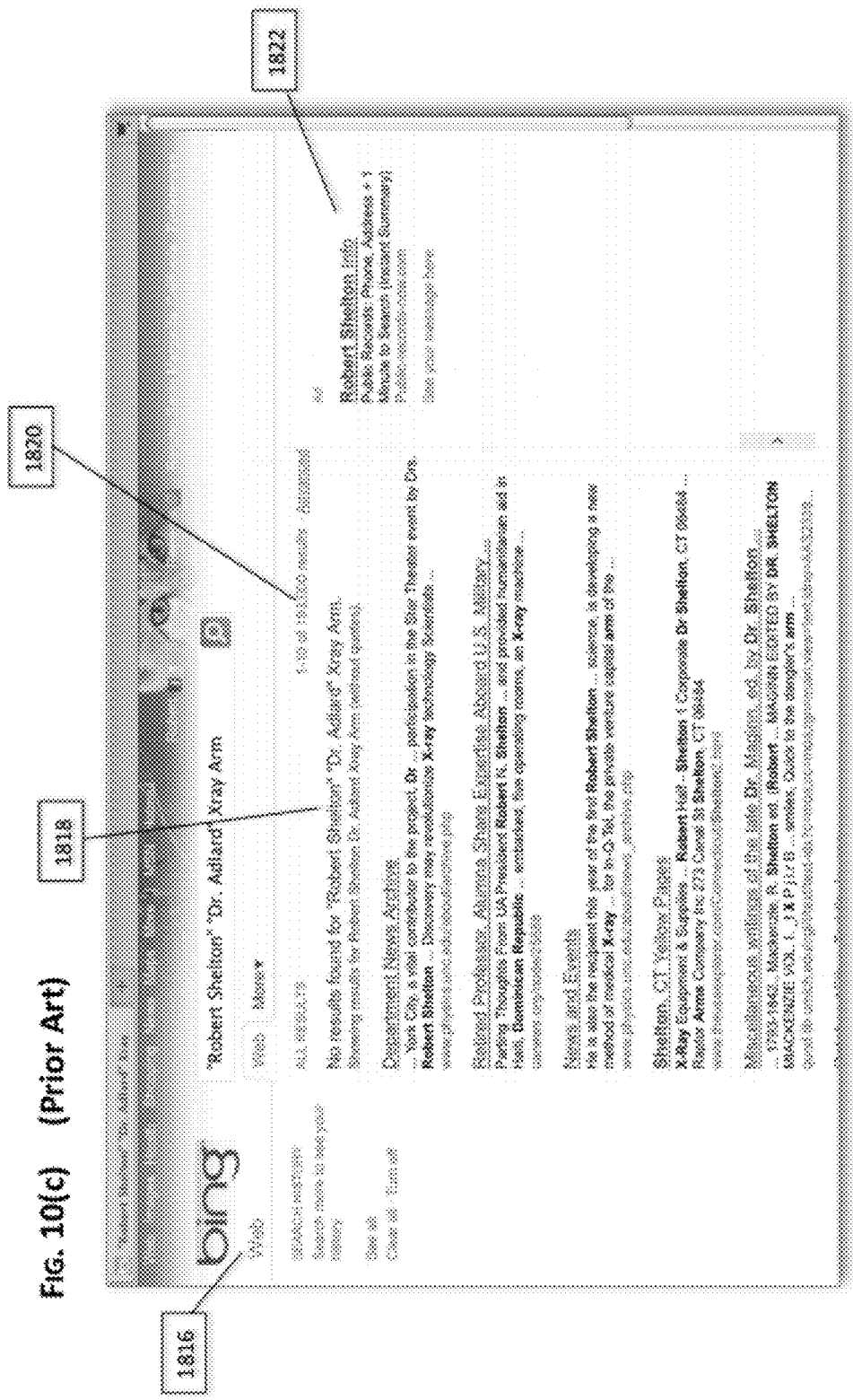
Figure 10D:
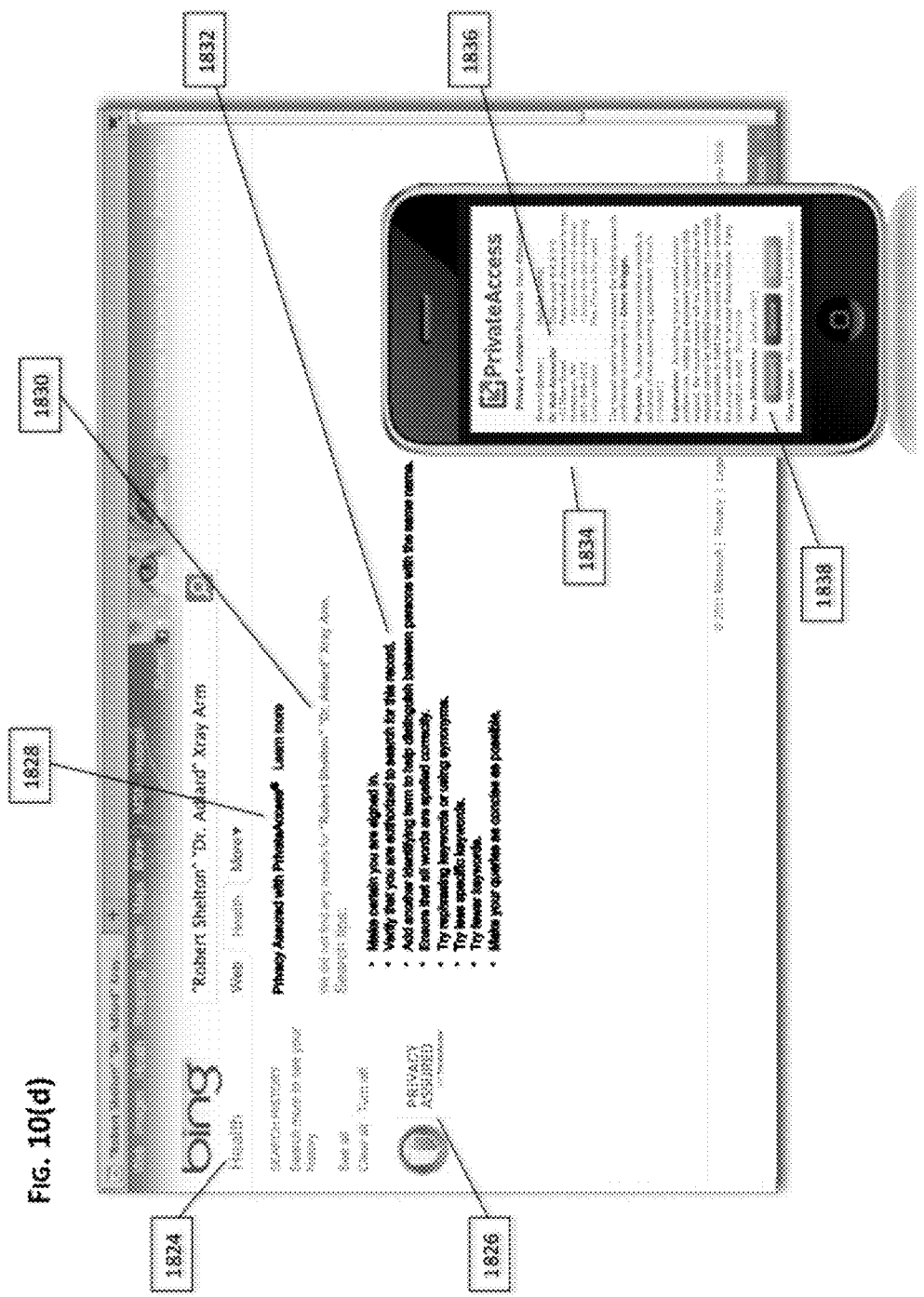
Figure 10E:
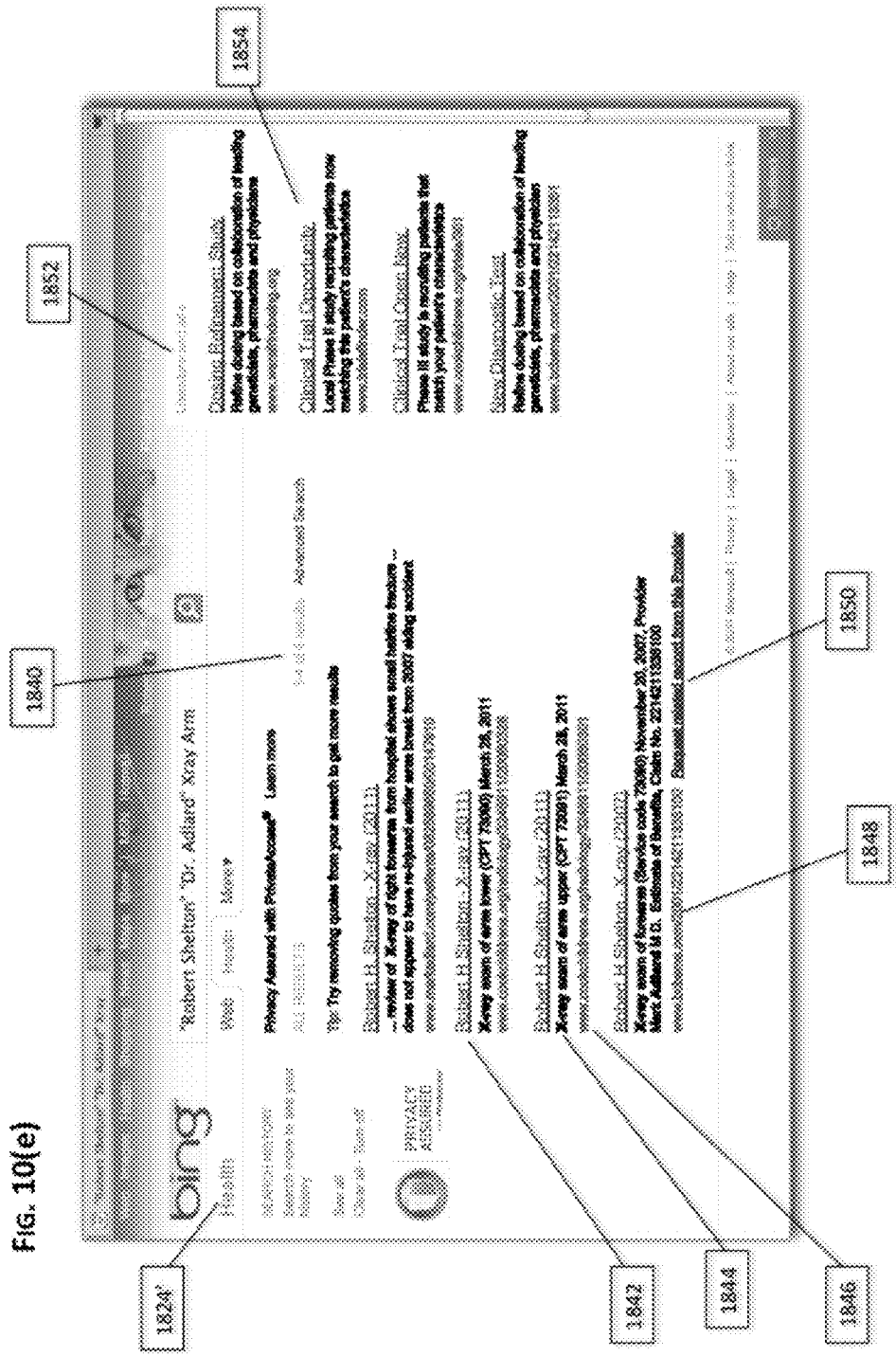

FIG. 9(b) indicates a preferred embodiment for carrying out such previously identified integration of these processes with the hereinabove disclosed functions of the private access bureau. In this non-limiting example, beginning in step 1701, a Web site or consumer-facing service offers the option for scheduling an appointment (such as a doctor's appointment) online. It is well known that online scheduling of medical appointments is becoming more common. Facilities for scheduling such appointments online are currently being offered by a number of major medical centers and clinics, through online publishing sites, from insurance company portal sites, and in connection with booking appointments for diagnostic tests (as illustrated by the "Make an appointment" feature 1667 on interface 1660 for a major testing laboratory, and other specialty services. The feature is also included within many of the leading practice management systems and electronic health records systems, some of which provide the option for exposing through a widget an opportunity for patients to schedule appointments online that may be easily added to an individual health practice's website. In addition, several online scheduling services, are attempting to build national, cross-practice scheduling systems.

The patient indicates one or more search terms 1712 to commence the process of locating a physician. Generally, this search may be based on medical need and corresponding specialty, geographic convenience, patient feedback ratings, availability within a preferred date/time range, and other factors. Rectangular box 1714 displays the results of the search query based on the criteria indicated. If these results are not acceptable, the patient may elect to return 1713 to the earlier step and conduct another search based on different criteria, and by either adding, deleting or simply amending search terms or ranges, possibly produce different results. From results list 1714, the patient may select a doctor of interest 1716 and review a profile and other information about them 1718. If the patient wishes to continue searching, then she may return 1717 to the search results screen 1714 (or alternatively all the way back to 1712) and select one or more other doctors to review. Alternatively, if the doctor/date/time are deemed acceptable, then the patient selects a time shown 1720 and fills out the fields needed in order to book an appointment with that professional 1722.

In a preferred embodiment of the system, the patient is presented an opportunity 1724 to share her medical history with the doctor. Persons of ordinary skill in the art will appreciate that this will provide the doctor's staff a chance to pull the appropriate records in advance, possibly confirm credit history acceptability, and check with the doctor if something in the records suggests that someone different should see this patient. This will permit both the doctor (and his staff) to be better prepared for the appointment, thereby saving time and reducing overhead cost. From the patient's perspective, this opportunity to complete some of the paperwork in advance of the appointment is also able to reduce the time required when the patient arrives, and for simultaneously improving the quality of the data available to the doctor at the point of care.

Nevertheless, if the patient declines in step 1724 to supply medical history in advance of the appointment (or in one preferred embodiment, is unwilling to make her information accessible to search by the medical professional), then she is returned to the beginning webpage 1710, which ends the online scheduling flow. Alternatively, if she indicates a willingness to share her medical profile, then in one preferred embodiment, the system fetches a medical history template 1726 for the doctor with whom she has booked an appointment, or if the professional or his staff have not yet approved a template for this purpose, then the system provides a generic template for the type of professional. In step 1728, the patient is asked (or if permissions are available from the private access bureau, then the system may already know) whether she has an existing medical profile. If she does, then in step 1730, the selected template is filled using data from the patient's existing profile, and in step 1732 the pre-completed form is displayed to the patient for review. Alternatively, if in step 1728, the patient does not already have medical information from which the system is able to pre-populate the template, then the patient is prompted in step 1734 to manually fill out the form fields, whereupon it is displayed to the patient for review 1732.

The patient is then asked at step 1736 whether all of the data included in the form is complete and current as shown. In an optional preferred embodiment, any responses that are incomplete, or for which conflicting or illogical data appears, will be highlighted. If the patient wishes to supplement any responses, she is returned to step 1734 to manually enter and/or update the appropriate information. At the point that she is comfortable at step 1736 that the form is complete, the system will proceed to step 1738 and preferably ask whether she has a private access bureau account (or if permissions are available from the bureau, then the system may already know she does). If so, then the system asks at step 1740 (or in an optional preferred embodiment already knows based on current privacy preferences) whether the current privacy settings permit the data to be shared with the intended recipient. If such rights to share the information already exist as confirmed by the transfer API sequence 1741 generally as illustrated in FIG. 5 (and if deemed useful, confirmed by the patient in an optional preferred step), then authorization is given to the data holder in step 1742 to make the information available and it is sent to the medical professional (or they are informed that it is available to them via privacy-enabled search) in step 1744, the audit log service is updated 1742, and the patient is returned to the beginning webpage 1710, which ends the online scheduling flow.

Alternatively, if at step 1738, the patient indicates that she does not have an account, she is redirected to the private access bureau to establish a new account 1746 before continuing. Whether in setting up a new account, or alternatively for an existing account adding additional privacy preferences that permit the data to be shared with the selected person, role and/or group, then at step 1748, the patient is presented with an opportunity to make this designation. In one preferred embodiment, this is achieved using an alert such as illustrated by user interface 1542 in FIG. 7(*b*); and in optional step 1750, the patient is presented one or more opportunities to consider other possible privacy settings. List 1752 provides a number of examples, including making data available for clinical trials recruitment generally in the manner illustrated by user interface 1572 in FIG. 7(*b*), expressly permitting data to be used to tailor marketing offers for goods or services of interest to the patient at this time, and soliciting data from other sources such as described above in conjunction with FIG. 8 and user interface 1602 of FIG. 7(*c*).

In a preferred embodiment, all of these additional privacy preferences are important but since setting them was not the primary reason for the patient's visit, discretion needs to be used to avoid overwhelming the patient with too many approvals from list 1752 during a single user session. And, at the conclusion of step 1750, in such alternative workflow, authorization is given to the data holder in step 1742 to make the information available and it is sent to the medical professional (or they are informed that it is available to them via privacy-enabled search) in step 1744, and the audit log service is updated in step 1742. At this point, the patient is returned to the beginning webpage 1710, which ends the online scheduling flow. Persons of ordinary skill in the art will appreciate that in one preferred system, the entity providing online scheduling (e.g., fulfilling steps 1710 through 1724) may be different from the one (or ones) holding the patient's relevant medical data from which the medical history may be rapidly and thoroughly compiled (e.g., fulfilling steps 1726 through 1744), and the private access bureau (e.g., fulfilling the remaining steps 1746 through 1742) are not the same. Accordingly, a feature of one preferred embodiment of the private access bureau is to enable this specialization, and the added efficiency of permitting personal medical records to remain in the hands of the entities that originally created them (and be responsive to search), as described above.

FIGS. 10*a* through 10*e* are illustrations of search engine screens and are illustrative of the consequences of the foregoing user interfaces, workflows and functioning of the private access bureau to make confidential and/or otherwise private records responsive to a query, including without limitation a standing-order database search query, visible in such privacy-assured search results. FIG. 10(*a*) illustrates the present state of the art in Internet-based search engines for use by individuals. Persons or ordinary skill in the art of database search will recognize that a consumer search engine such as Google®, Bing®, Yahoo! Search, Baidu, Ask and AOL Search represents one category of Internet-based search. By way of non-limiting example, others include specialty search engines focused on a particular topic such as business, classified, dating, entertainment, jobs, law, news, people and real estate; vertical market websites that have a search facility; enterprise and geographic-based search engines, machine-based search where a search algorithm mines data available in networked databases or open directories, and generally any database inquiries that involve a "find" command from within a networked database or data index of data, metadata and/or meta-metadata. Although these other forms of search are not illustrated, many of the underlying principles are embodied in the non-limiting example provided.

Subparts (a) and (c) of FIG. 10 are representative of a traditional, consumer-facing Internet search engine. FIG. 10(*a*) shows a conventional Web-browser 1802 used to access the search Home Page 1804, which in turn displays a number of channels 1806 and a search field 1808. Most persons are aware that a searcher simply enters into search field 1808 one or more search terms followed by the Return key in order to locate a ranked list of documents containing these terms. It will also be apparent to persons of ordinary skill in the art of search that placing quotation marks around several words, indicates that the searcher seeks to locate the exact phrase. Thus, as shown, the illustrated search is quite apparently seeking to locate an arm x-ray associated with an individual and a medical doctor, or documents containing these four search terms.

FIG. 10(*b*) illustrates a new "health" channel 1810 and promotional message 1812, each of which would preferably be located as part of search engine Home Page 1804. In conjunction with the statement that the search engine may be used to locate personal health records, the illustration also preferably displays a brand mark 1814 associated with the private access bureau, which mark indicates that the Web-enabled service is privacy-assured, as hereinbefore defined. FIG. 10(*c*) comprising search results page 1816 shows the actual results of such search employing currently available Internet-based search technology. As stated in message 1818, the search engine was not able to locate any results for the exact Boolean expression submitted, which as noted above included phrases for the name of the patient and the physician. Accordingly, the results shown are, rather, for the six words shown in search field 1808 without use of quotation marks. On this basis, note 1820 indicates that this search returned "193,000 results." Regrettably, however, even a cursory view of the top-ranked search results shown on results page 1816 reveals that none of these are the medical records being sought in the illustrative example. Search results page 1816 also includes advertisement 1822, which persons of ordinary skill in the art of search will appreciate displays paid advertising that the search engine infers as being of relevance to the searcher. One of the limitations of the current state of the art is that inference-based advertising is less powerful than permission-based ads, and second that when a search result (as here) is so clearly off-topic, the advertising associated with it is likely to be equally misaligned with the searcher's true interests. The private access bureau addresses both of these limitations of the present state of the art.

FIG. 10(*d*) illustrates important teachings of the invention for hypothetical search result page 1824, now shown as being for the "health" related channel and displaying the private access bureau brand assurance 1826 and including a link to an explanation 1828 where the user is able to learn more about this protection. Because one of the critical issues for large-scale health data sharing and privacy-enabled search to grow explosively concerns trust, the independence, transparency, and frequency of display of a trust mark 1826 are likely to be important factors in building broad market confidence in the system of the preferred embodiment. Assuming that the privacy directive concerning the records responsive to the query appearing in search field 1808 indicates that these results are only accessible with the data subject's express authorization, search results page 1824 shows how such directive could be implemented by a public search engine. Message 1830 indicates that the search inquiry did not find any results for the inquiry as entered (e.g., including commas in the Boolean expression). At least two reasons are possible, namely that truly no responsive results exist, or that while responsive results do in fact exist, the searcher does not have the right to know the results of her search. Hence, the application indicates in list 1832 a number of possible reasons, as well as tips for possibly obtaining better results.

Persons of ordinary skill in the art for consumer-oriented search engines will readily appreciate that in addition to the "typical" recommendations such as "Try fewer keywords" and "Try less specific keywords," which advice applies to searching public as well as private records, list 1832 also contains several recommendations that are expressly focused on the additional requirements for privacy-assured search queries to perform well. For example, list 1832 includes "Make certain you are logged in" (since one of the common requirements for successfully searching for private information is that the searcher be logged in and properly authenticated) and "Verify that you are authorized to search for this record" (since the essence of such privacy directives is to ascertain whether the searcher has the right—e.g., is authorized in the manner hereinabove described—to receive a private data element in her search results. Yet another recommendation listed that is unique to privacy-enabled search is "Add another identifying term to help distinguish between persons with the same name." Thus, for example, if there were two patients of the same first and last name, and who both had the same doctor's name in the search results, but wherein the data for only one of these two were permitted to be shared with the searcher, neither result could be displayed until this possible overlap was resolved that could lead to erroneously disclosing one of the two results. Thus, for example, entry of the mailing address for the user or a telephone number might be sufficient to distinguish between the data subjects, such that if the privacy directive for that result provided the searcher with the right to see these records, then it would appear in the search results page. However, another aspect of the invention provides added protections through dynamic consent; and generally as described above with respect to FIGS. 4 and 5, the system sends an alert requiring action by the data subject.

In this regard, mobile device 1834 is shown, and includes privacy alert 1836 corresponding to the alert previously described in connection with user interface 1542 of FIG. 7(*b*). To the extent that the foregoing search query was presented by the physician listed as a data seeker, and the patient was the person authorized to grant consent to access said records that are responsive to such inquiry, then by clicking on the green consent button 1838, he would be able to update the privacy directive concerning such responsive data in the manner hereinbefore described, and the search results would thereafter appear in said data seeker's search results 1824' shown in FIG. 10(*e*). As illustrated, based on the effect of such privacy directive, note 1840 indicates that there are four results that are responsive to the query and for which the searcher has the right to see search results. Each of these results are displayed with a subject line or title 1842, a brief excerpt 1844 showing the portion of the data that includes key search terms, and a hypertext link 1846 for accessing the record from the server on which it is contained such as data repository 1670 on FIG. 8, or other privacy-enabled Web server.

In one preferred embodiment, the search results also contain responsive documents for which the underlying document is held elsewhere—perhaps not even in a digital form. Thus, for example, search result 1848 shows that a prior healthcare claim paid by the patient's insurance company includes the relevant search terms. This result is accompanied by a link where this estimate of benefits report is contained. And, as shown in the example, this result may include link 1850 that provides the user an ability to order the underlying record from the data holder. Display advertising 1852, which in this case is able to be permission based, is presented, and includes links 1854 for additional information and to arrange contact.

Figure 11B:
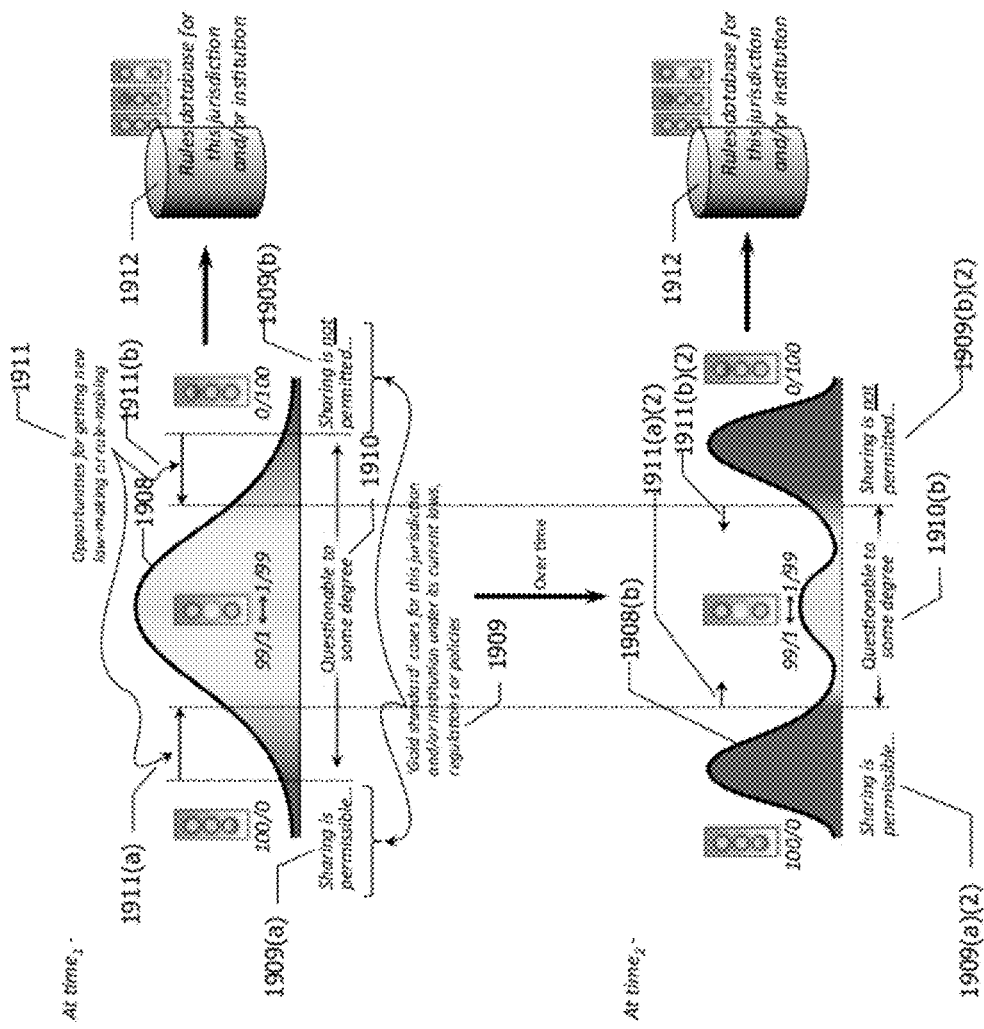
FIG. 11, consisting of subparts 11a, 11b and 11e, is an illustration showing how the private access bureau may be configured to identify areas where ambiguities exist in potentially applicable laws, regulations and policies, and continuously enhance its rules database of applicable laws, statutes, regulations, institutional policies and adjudication priority.
Figure 12:
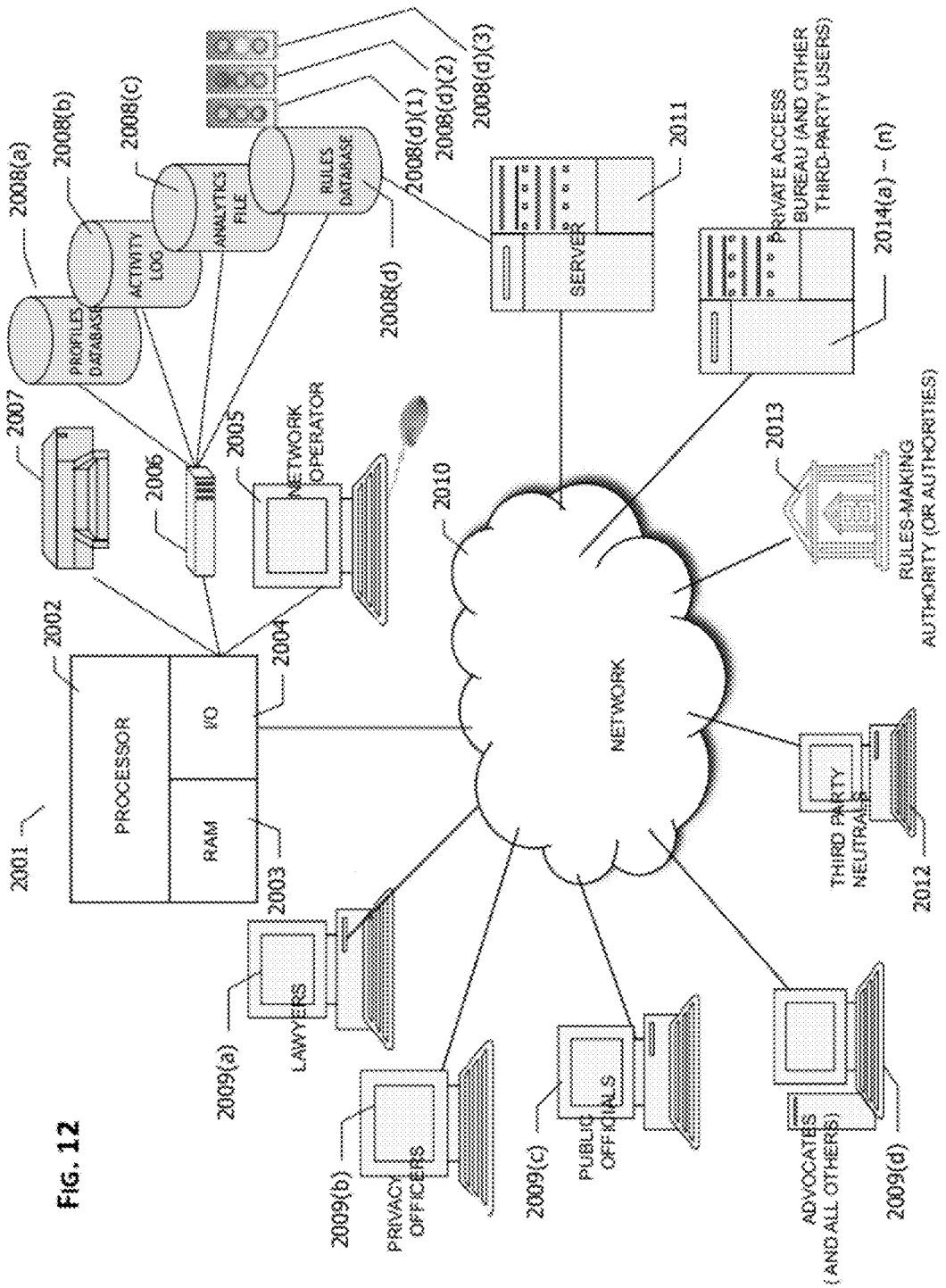
FIG. 12 is a diagram that depicts a distributed digital data processing system environment of the type with which such establishment and continuous enhancement of the rules database depicted in FIG. 11 may be practiced.

Now turning to FIG. 11(*a*), which depicts practice of the principles hereof suitable for implementation in the system identified in FIG. 12, a description of which follows thereafter. In this regard, it will be observed that the first numbered element in FIG. 11(*a*) is rectangular box 1901, entitled "Enclosed channel private network." Persons of ordinary skill in the art of social networking will note that the label shown for rectangular box 1901 also indicates that the network is focused on a single jurisdiction. While it is not required that each jurisdiction be addressed in a separate private professionals network, it is nonetheless deemed preferable that this be done.

As described with respect to FIG. 11(*c*), multiple jurisdictions rules are preferably taken into account in processing an inquiry respecting which a data holder may wish to share information with a data seeker. However, given the objective that the system continuously improve over time, which is anticipated to require actions to amend and/or clarify various laws, statutes and rules, which will necessarily require actions in different jurisdictions, it is deemed preferable that each jurisdiction be able to function independently. At the same time, it would be highly desirable that experiences attained for one jurisdiction such as a state or province be considered by others undertaking similar rules-making discussions, and therefore in a preferred embodiment there may be a role for a neutral party who has worked with (or is concurrently working with) multiple jurisdictions. For the foregoing reasons, the preferred embodiment reflects that private network 1901 is focused on the critical topics of discussion 1902 respecting rules making authority 1903 for use cases 1904. Thus one role for such optional neutral party may be to bring such critical topics 1902 and/or the existence of use cases 1904 to the attention of professionals network 1901.

Such network is comprised of various subject matter experts, inquirers and commentators 1905, including in a preferred embodiment lawyers 1905(*a*), and privacy compliance officers 1905(*b*) who possess experiences working with and/or for entities that handle confidential documents. Additionally such professionals would preferably include public officials and their spokespersons 1905(*c*); as well as various cause-related advocates and other persons having an interest in the exchange (or, as the case may be, in limiting the exchange) of confidential data and records 1905(*d*). In a preferred embodiment, each of such subject matter experts, inquirers and commentators 1905 are able to access and participate in professional network 1901 using a standards-based Internet browser and interface, illustrated by arrows 1906(*a*) through 1906(*d*), respectively, from computers 2009(*a*) through 2009(*d*) illustrated on FIG. 12, below.

The results of discussions, internal opinion polling, posts, and the corresponding input offered by such community members, invited guests, as well as the materials provided by such persons with respect to such discussions (collectively herein referred to as "crowd-sourcing"), is compiled and analyzed using various data analytics means 1907 that is well known to those of ordinary skill in the art to ascertain the consensus, if any, regarding the clarity and applicability of specific laws, rules, statutes, regulations, policies and the like. Normal curve 1908 reflects one possible result of such data analysis. While there are obviously an infinite variety of possibilities for how readily accessible machine computation rules may be derived for various jurisdictions and/or institutions, curve 1908 is offered merely for illustrative (rather than ascription) purposes as of a particular point in time (e.g., as of "time 0").

Persons of ordinary knowledge in the art will observe that normal curve 1908 includes asymptotic nodes 1909(*a*) and 1909(*b*), which as shown in FIG. 11(*a*), are considered to constitute "gold standard" cases under the indicated jurisdiction's and/or institution's existing laws, regulations or policies for the reason that according to the professionals network, there is little to no disagreement as to the meaning and applicability of such law, regulation or policy 1902 to a given use case 1904. Thus asymptote 1909(*a*), shown at the far left end of normal curve 1908 and shaded solid green in the illustration, represents those instances in which the professionals network reflects for a particular use case 1904 that the jurisdiction or data holder institution permits sharing the data. For the purposes of illustrating the clarity of this input—preferably including favorable comments regarding the input made by others, including those that may commonly tend to disagree with the position or speaker—this asymptote is also accompanied by the notation "100/0" and a "green light," respectively meaning that for the particular use case, there was unanimity (or near unanimity within a commonly-accepted bound of variation) that sharing is permissible under the applicable law, statute, policy or the like 1902.

By way of a non-limiting example, consider that if the use case 1904 involved access to medical data respecting a patient's EKG results from a electrocardiogram taken several days earlier for a now unconscious patient being seen in a hospital emergency room after complaining of chest pains in the middle of the night, and where the requester (e.g., the data seeker) is an emergency room physician, and the purpose for which she is requesting the record is to consider the appropriate treatment for the patient as a comparative data point to the EKG results shown at the time the patient is being examined. In this use case, under the laws of a large majority of state jurisdictions in the United States as well as federal law under HIPAA, the categorization of the applicable law and action—in this case, "data sharing is permissible" even without the patient's consent or authorization—would be quite likely. Accordingly, this case 1904 would be characterized under the applicable jurisdiction's regulations 1902 as falling within category 1909(*a*) reflected in FIG. 11(*a*).

Asymptote 1909(*b*), shown at the far right of normal curve 1908 and shaded solid red in the illustration, represents those instances in which crowd-sourcing the views of professionals network 1901 reflects for a use case that the jurisdiction or data holder institution prohibits sharing the data. For the purposes of illustrating the clarity of this input—preferably including favorable comments regarding the input made by others, including those that may commonly tend to disagree with the position or speaker—this asymptote is also accompanied by the notation "0/100" and a "red light" meaning that for the particular use case, there was unanimity that sharing is not permitted under the applicable law, statute, policy or the like.

As another non-limiting example, assume that the patient's chest pains pass and, given the circumstances, were diagnosed by attending medical professionals as most likely having been digestion related. Assume further that as the patient is completing his discharge paperwork, one of the attending nurses notices that the patient appears to have Psoriasis on one shoulder. Assume that she is aware that a pharmaceutical firm is trying to recruit a cohort of subjects for a Phase II trial of an investigational Psoriasis medication, and that given the patient's age and other demographic information, she thinks that he might meet criteria, and that she therefore would like to share his name, contact information, and relevant medical data with the research sponsor. Finally, assume that the institutional policy stipulates that in order to protect patient privacy, providing the names of individuals to researchers as potential subjects requires following the terms of the IRB, which in this instance states that all contacts must be made through the patient's personal doctor and/or based on responding to inquiries from prospective subjects who've responded to IRB-approved advertisements. Given these facts, if we presume that the professionals network 1901 for the hypothetical jurisdiction concludes that for the applicable use (e.g., sharing personally identifiable information with the research sponsor) requires patient consent that has not been obtained, then the use case 1904 and rule 1902 would fall within the "data sharing is not permitted" area designated as area 1909(*b*) on FIG. 11(*a*).

Turning next to the area situated in between these two extremes, which is designated on the illustration as area 1910 and labeled "Questionable to some degree," it will be apparent that the shading ranges from a greenish yellow color adjacent to area 1909(*a*), to a reddish yellow tint immediately adjacent to area 1909(*b*). The area also includes the phrase "99/1→1/99" to designate that analysis of the proceeds of crowd-sourcing input from professionals network 1901 reflects less than a "gold standard" 100/0 or 0/100 conclusion with respect to rules 1902 for specific use cases 1904. This entire area is designated as falling under a "yellow light" even if a significant percentage of the professional network 1901—but nevertheless a lower percent than the threshold percentage established as falling within asymptotes 1909(*a*) or 1909 (*b*)—argued in favor of one position or another. Optionally, in one preferred embodiment of the system, in order to reduce the ability of a recalcitrant or consistently unreasonable contributor, members of the community 1905 might be polled about their view of such argument, and only those arguments considered by a threshold percentage of the professional network 1901 determined to be credible would be taken into account for purposes of such data analytics 1907.

Thus, in the foregoing example, assume that use case 1904 was modified to include as an additional fact that oral permission was first requested by the institution's employee and given by the individual, and a poll the professionals network 1901 concerning whether this would be adequate consent under their jurisdiction's regulations and/or policies 1902 was conducted. In this instance, even if the network was strongly leaning one way or the other, it would still be reflected as "yellow" for the purposes of the preferred embodiment being described. Nevertheless, given the strong concurrence leaning in one way for this use case, the situation could fall within area 1911, namely "opportunities for new rulemaking or lawmaking."

This area, consisting of sub-parts 1911(*a*) and 1911(*b*), shows that based on the distribution of crowd-sourcing data collected—there is an opportunity for getting new law-making or rule-making to clarify that the leaning is correct (or not) so that in the future—e.g., in "time 1", such factual situation would be able to be declared as falling within the asymptote rather than the blurred area in between. If the rules making body, for example, wanted to make it clear than oral approvals were insufficient, the rule could specify that with written proof of consent, the use case 1904 would fall within asymptote 1909(*a*) but that all other cases would produce a "sharing is not permitted result" 1909(*b*).

Persons of ordinary skill in the art will appreciate that gold standard cases 1909(*a*) and 1909(*b*), and all "in between" cases 1910, can be compiled and included using conventional means in rules database 1912, where these are reflected as rules 1912(*a*) through 1912(*c*), respectively. As shown in FIG. 11(*a*), in step 1913, a weighted expression of these analytics can then be incorporated using conventional means in the programming of the private access bureau 1914 for this particular jurisdiction and/or institution. As shown, these rules can be applied by such private access bureau when, in effect, asked by the data holder administrator in step 1914 "Do I have the right to share this data with them?" (e.g., referring to authorizing access to specific data by a particular data seeker for a specified use). This may be useful in establishing legal and institutional directives 1006 and 1008 of FIG. 2 (and corresponding policies 1210, 1212 and 1214 in FIG. 4 and legal authority database 1314 in FIG. 5).

Similarly, opportunities falling within area 1911 shown in FIG. 11(*a*) can be referred as potential changes in laws, policies and regulations 1915 to the appropriate rules making authority 1903, along with the results of deliberations of constituents 1905 regarding that or those rules 1902, and their affect on use case 1904. Although not explicitly shown in FIG. 11(*a*), this is reflected by use of computer 2012 to generate documents used (directly or via electronic connectivity) to such rules making authority 2013 of FIG. 12.

Turning next to FIG. 11(*b*), persons of ordinary skill in the art will readily appreciate that this illustration shows the effect of changes instituted by such jurisdiction 1903 between time$_0$ and time$_1$. Thus, as illustrated, over time, conversion of opportunity areas 1911(*a*) and 1911(*b*) to rules that are deemed by such professionals network as being clear, concise and non-ambiguous, will result in changing asymptote 1909(*a*) into area 1909(*a*)(2), and asymptote 1909(*b*) into area 1909(*b*)(2), with the area reflecting residual use cases that are questionable according to at least some threshold percentage of the professionals network being reduced from 1910 to 1910(*b*). These additional rules would be incorporated as updates to policy repository database 1912 for this jurisdiction and/or institution, such that the rules are current and up-to-date. As noted in the figure, there would still likely remain at time$_1$ additional opportunities for new law-making and/or rule-setting between time$_1$ and a future date (e.g., time$_2$), such opportunities being illustrated as areas 1911(*a*)(2) and 1911(*b*)(2).

Turning finally to FIG. 11(*c*), it is shown that in a preferred embodiment, the private access bureau would include as its processing rules 1914 (corresponding to the respective policy database repository shown in FIGS. 2, 4 and 5) the weighted expression of the analytics from multiple jurisdictions 1903-(1) through 1903-(*n*), contained in rules databases 1912-(1) through 1912(*n*). To date, much of health information exchange has been funded through government grants; and persons of ordinary skill in the art of health data exchange will appreciate that considerable concern has been expressed regarding the need for entities involved in data exchange as well as a number of governmental and/or quasi-governmental entities that may be optimally positioned to serve as third-party neutrals to become self-sustaining. In order to help defray related costs and provide an economic return, entities involved in compiling such rules databases may in one option preferred embodiment establish a licensing fee or other usage charge for permitting the incorporation and use of their rules into the processing of the private access bureau. Thus, as a non-limiting example, if a private access bureau charges for its services on a per click basis using payment collection method 1018 of FIG. 2, then a percentage of each such click fee may be paid as a service fee to the jurisdictions from whom the applicable data was derived, an annual licensing fee may be charged for such use, and/or some combination of such arrangements may be utilized. The utility of such system need not be limited to healthcare regulations, laws and policies.

Finally now turning to FIG. 12, it will be observed that this figure depicts the primary components of a preferred system in accordance with the principles of this aspect of the invention. Depicted therein are digital data processor 2001, including a processor section 2002, a random access memory section 2003, and an input/output control section 2004. Digital data processor 2001 is connected via input/output control section 2004, to workstation 2005 (including a monitor, keyboard and pointing device), one or more drives or alternative storage media 2006 for storage of software and data, and printer 2007. As shown, the software and data maintained on storage media 2006 preferably includes a profiles database file 2008(*a*), activity log file 2008(*b*), analytics file 2008(*c*) and rules database 2008(*d*). Such rules database preferably includes sub-parts 2008(*d*)(1), 2008(*d*)(2) and 2008(*d*)(3), comprising rules for use cases described with respect to FIG. 11 in which according to various jurisdictional authorities, data sharing is permissible, not permitted, and for which sharing is questionable to some degree.

As depicted, digital data processor 2001, as well as its sub-components 2002-2004, peripherals 2005-2007, and related databases and/or software 2008(*a*), 2008(*b*), 2008(*c*) and 2008(*d*), comprise the system managed and maintained by a professional network operator. Said network operator, along with other computers 2009(*a*), 2009(*b*), 2009(*c*) and 2009(*d*) are coupled via network 2010 to file server 2011. As depicted, computer 2009(*a*) comprises a representative workstation used by attorneys 1905(*a*) having an interest (either personally, or on behalf of one or more clients) in the topics discussed in professional network 1901 running on network 2010. Computer 2009(*b*) is illustrative of a representative workstation employed by privacy and/or other compliance officers 1905(*b*) having an interest (either personally, or on behalf of one or more clients). Although it is considered likely that a number of attorneys and privacy officers employing the system will also be users of the services of the private access bureau and may employ a single computer workstation, these individuals are nonetheless depicted separately in FIG. 12 solely for the purposes of illustrating the invention.

Computer 2009(*c*) depicts a representative workstation maintained by a public official or regulatory agency 1905(*c*) for oversight purposes and to respond to questions or provide materials to the professional network 1901. Computer 2009 (*d*) illustrates a representative workstation employed by one or more advocates or other interested parties 1905(*d*). Digital data processor 2001, as well as its sub-components 2002-2004 and peripherals 2005-2007, preferably comprise a conventional commercially available personal computer or workstation adapted in accord with the teachings herein for storing, accessing and processing data bases, rules and algorithms 2008(*a*)-2008(*d*). Computers 2009(*a*)-2009(*d*) and server 2011 also comprise conventional commercially available components of their respective types. Network 2010 may be, as a non-limiting example, the Internet or any alternative public and/or proprietary networks. Computers 2009(*a*)-2009(*d*) can likewise be adapted in accordance with the teachings herein for viewing a browser for supporting search, content submission, attachment posting, chat and messaging services, bulletin board, polling, anonymous and/or identified registration and profile features, topic-creation, and internal and external site-linking capabilities according to a system clock and rules database.

FIG. 12 also illustrates optional interconnections with third-party neutrals 2012, such as interest groups and quasi-governmental bodies, as well as rules-making and law-making authorities 2013. Finally, FIG. 12 illustrates a connection to the one or more private access bureaus 2014 or other third-party users of rules database 2008(*d*). Those skilled in the art of large system design will appreciate that, in addition to implementation on stand-alone or "networked" computers of the type shown in FIG. 12, the system and methods and taught herein can be implemented on other digital data processing apparatus of the type known in the art (e.g., mainframe computers, network computers, dedicated microprocessor-based systems, handheld wireless devices and other network-system devices etc.)

As will be perceived by those skilled in the art, pertinent components needed for implementation of the system and method will vary corresponding to certain optional features, and the components identified in the various figures are set forth for illustrative purposes and are not intended to suggest that all of such components and/or data are required in every instance in order to implement the principles hereof.

Although, all of the features of the system are not required in order to practice the principles of the invention and thus some are optional, it should be apparent to persons having ordinary skill in the art that each of the features illustrated in the accompanying drawings and the foregoing description are attractive and add to the usefulness of the invention. Likewise, certain steps of embodiments which employ automated entry, calculation and/or reporting, may be conducted through manually written documents or semi-automatically though operation of the system processor and communication by modem, wired or wireless networking and the like.

As will be evident to persons who are skilled in the art, a well-ordered system may provide for the foregoing steps at any number of points in its operation. Accordingly, although these process steps are shown in the drawings and accompanying written description at particular points, it should be understood that this is illustrative only and does not suggest that some or all of these steps may not take place at other points during operation of the system. Similarly, although graphical user interfaces are shown that embody some or all of these features described herein, it should be understood that these interfaces are merely illustrative and should not suggest that some or all of these features may not be carried out using one or more different graphical user interfaces.

Additionally, although the disclosure hereof has been stated by way of example of preferred embodiments, it will be evident that other adaptations and modifications may be employed without departing from the spirit and scope thereof. Accordingly, the terms and expressions employed herein have been used as terms of description and not of limitation; and thus, there is no intent of excluding equivalents, but on the contrary it is intended to cover any and all equivalents that may be employed without departing from the spirit and scope of this disclosure.

What is claimed is:

1. A system for controlling access to private information, comprising:
  a privacy preference repository accessible by one or more subjects of said private information and by a private access bureau, said privacy preference repository storing privacy preferences configured by said subjects to indicate conditions for disclosure of said private information;
  a policy repository accessible by said private access bureau, said policy repository storing legal criteria for accessing said private information;
  wherein said private access bureau is configured to receive requests from privacy enabled systems for said privacy preferences and legal criteria required to release particular documents on said privacy enabled system in response to said privacy-enabled systems receiving a request for access to said private information.

2. The system of claim 1, wherein said private access bureau is configured to compare said request to said legal criteria and said privacy preferences in response to said request to determine which portions of said private information are authorized for viewing by a requestor in accordance with both said legal criteria and said privacy preferences.

3. The system of claim 2, wherein said private access bureau is configured to send to said privacy-enabled systems, an indication of which portions of said private record are authorized for viewing in response to completing said comparison.

4. The system of claim 3, wherein said policy repository storing institutional policy criteria for accessing said private information.

5. The system of claim 4, wherein said private access bureau further configured to adjudicate conflicts between said privacy preferences, said legal criteria, and said institutional policy criteria.

6. The system of claim 3, further comprising an audit database accessible by said private access bureau and by said one or more subjects, said audit database receiving audit records of information sent by said private access bureau to said privacy-enabled systems.

7. The system of claim 3, further comprising a transaction database accessible by said private access bureau and by said one or more users of the private access bureau, said transaction database being configured to receive payments by said parties requesting access to said private information in return therefore.

8. The system of claim 7, wherein said private access bureau being configured to disburse proceeds of such payments collected to the parties to whom such payments are obligated.

9. The system of claim 2, wherein said requester being a search engine, and the affected view being the search results page to an inquiry initiated by a user of such search engine.

10. The system of claim 2, wherein when said legal criteria are insufficient to permit such comparison and render a determination as to which portions of said private information are authorized for viewing, for reporting this to the appropriate governing body so that it may consider changes or clarifications in the legal criteria to enable such comparison.

11. The system of claim 1, wherein said subjects are able update said indicated conditions for disclosure of said private information using a mobile device.

12. The system of claim 11, wherein said updates by said subjects being in response to a specific request for approval initiated by said private access bureau.

13. The system of claim 12, wherein said request for approval by said private access bureau occurring in the event that the private access bureau is unable to successfully adjudicate conflicts between said privacy preferences, said legal criteria, and said institutional policy criteria.

14. A computer implemented method for controlling access to private information, comprising:
   receiving, by a computer implemented private access bureau having at least one processor, a request for parameters governing opening a private record from a privacy-assured application;
   reading legal criteria related to said private record from a policy repository of said private access bureau by said at least one processor in response to said request;
   reading privacy preferences related to said private record from a privacy preference repository of said private access bureau by said at least one processor in response to said request;
   comparing said request to said legal criteria and said privacy preferences by said at least one processor in response to said request to determine which portions of said private record are authorized for viewing by a requestor in accordance with both said legal criteria and said privacy preferences; and
   sending, by said private access bureau to said privacy-enabled application, an indication of which portions of said private record are authorized for viewing in response to completing said comparison.

* * * * *